(12) United States Patent  (10) Patent No.: US 7,093,555 B1
Olson et al.  (45) Date of Patent: Aug. 22, 2006

(54) DOCKING SYSTEM

(76) Inventors: Donald Olson, 1888 Nightengale St., Mora, MN (US) 55051; Paul Olson, 455 Aqua Cir., Lino Lakes, MN (US) 55014

( * ) Notice: Subject to any disclaimer, the term of this patent is extended or adjusted under 35 U.S.C. 154(b) by 0 days.

(21) Appl. No.: 11/148,943

(22) Filed: Jun. 9, 2005

(51) Int. Cl.
*B60P 3/10* (2006.01)

(52) U.S. Cl. .................................. 114/344; 280/414.1
(58) Field of Classification Search ............... 114/44, 114/45, 221 R, 230.1, 344; 280/414.1, 414.3
See application file for complete search history.

(56) References Cited

U.S. PATENT DOCUMENTS 4,684,145 A * 8/1987 Tingley .................. 280/414.1
4,995,629 A * 2/1991 Poppell .................. 280/414.1
6,412,432 B1 * 7/2002 White et al. ............ 114/221 R
6,543,377 B1 * 4/2003 Weir ........................ 114/344
6,904,861 B1 * 6/2005 Warner et al. ............. 114/344

* cited by examiner

*Primary Examiner*—Lars A. Olson
(74) *Attorney, Agent, or Firm*—Faegre & Benson LLP

(57) ABSTRACT

A docking system for a watercraft having a cross member carrying a tow hook cart to engage a bow eye on the watercraft and thereafter permit docking of the watercraft. The cross member is supported by at least one upright structure and may include a latch mechanism to release the cross member to swing away after the hook engages the eye. Alternatively, a cross member may be supported on both ends and may be pulled out of the way by the tow rope or rotated over the eye by a latch tripped after the hook engages the eye.

10 Claims, 35 Drawing Sheets

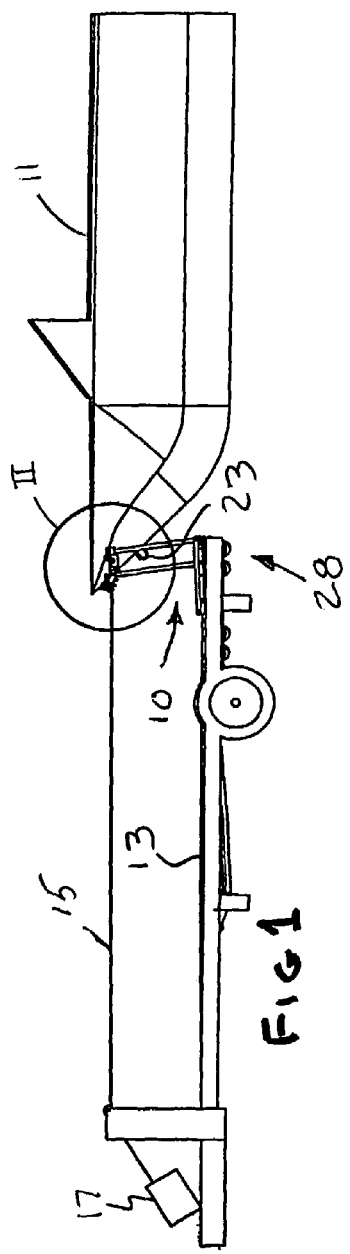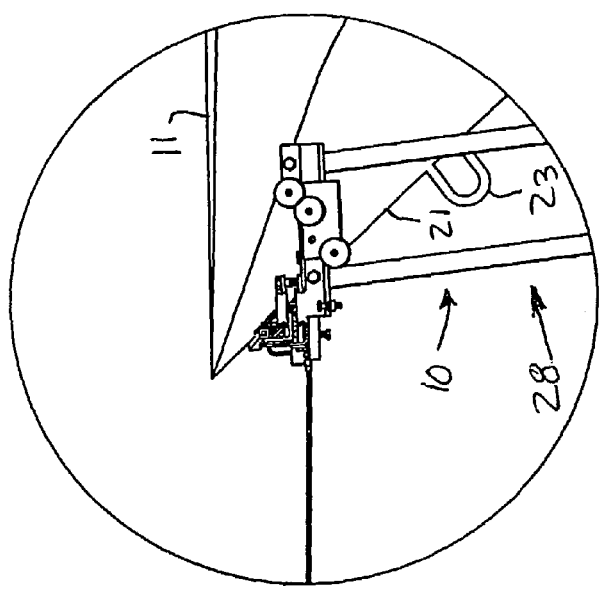

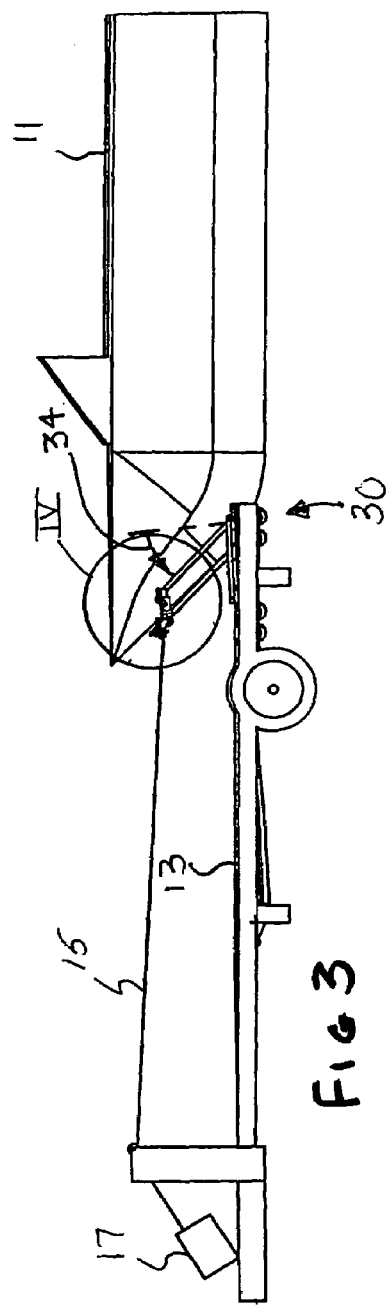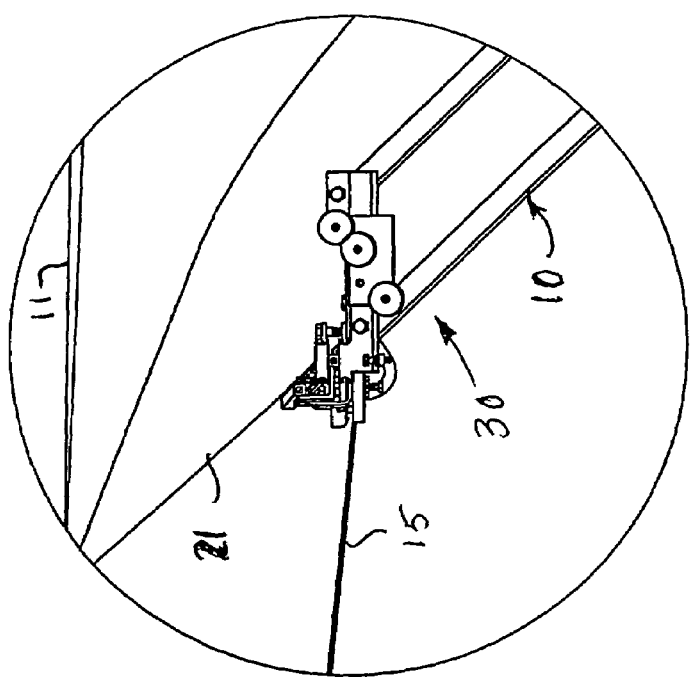

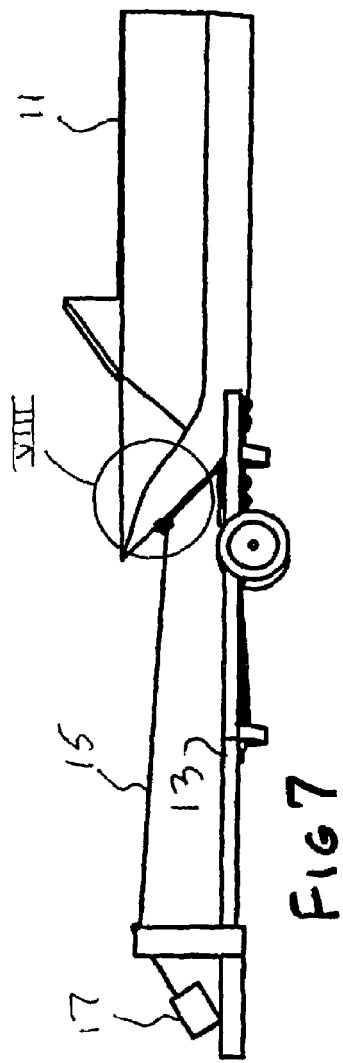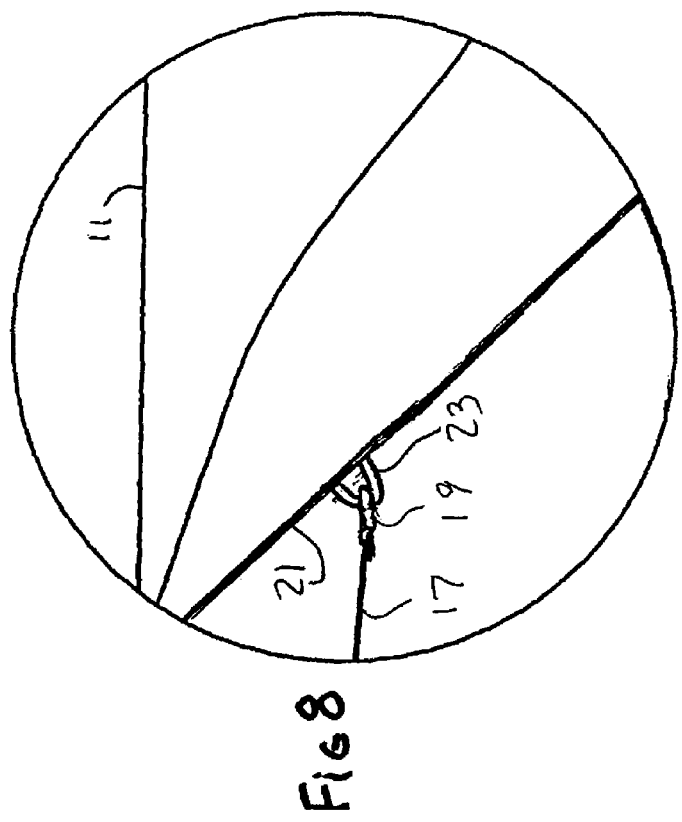

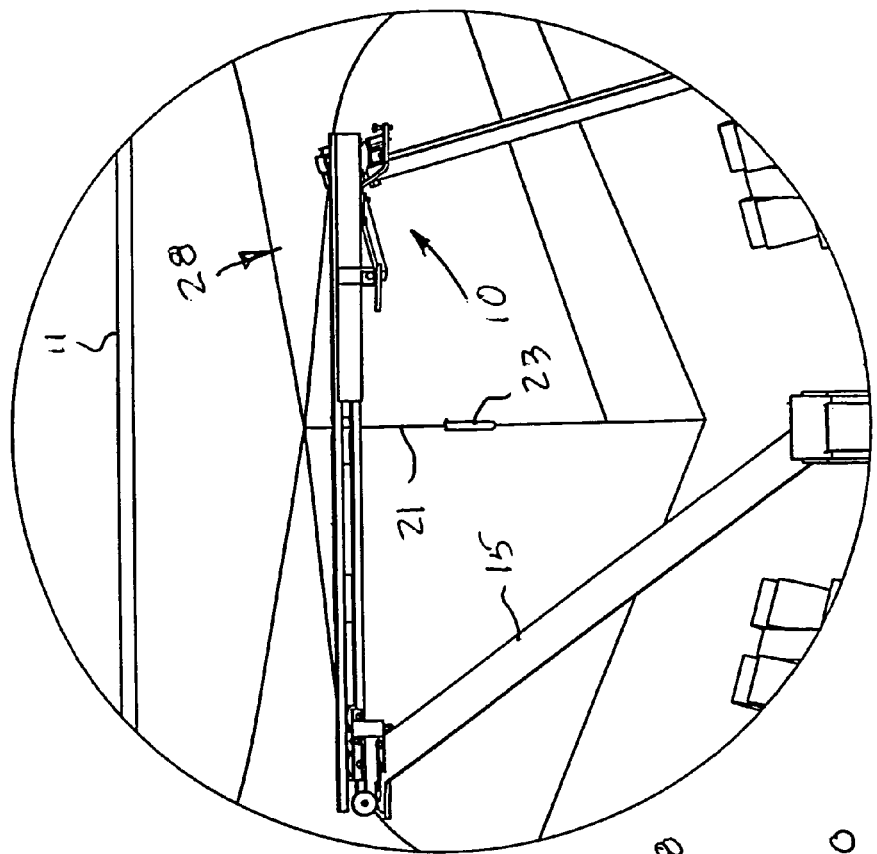
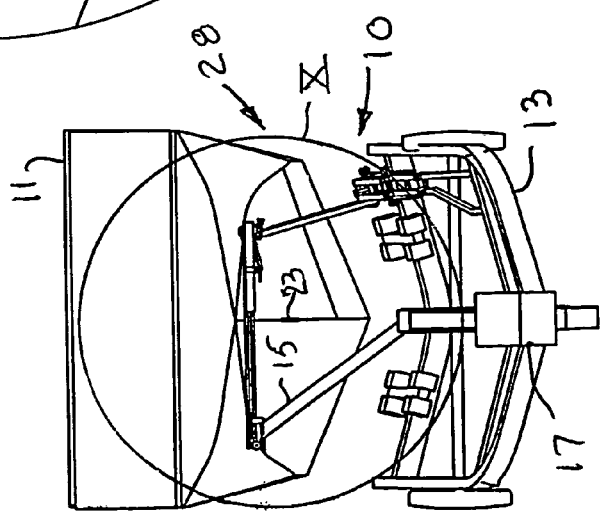
FIG 10
FIG 9

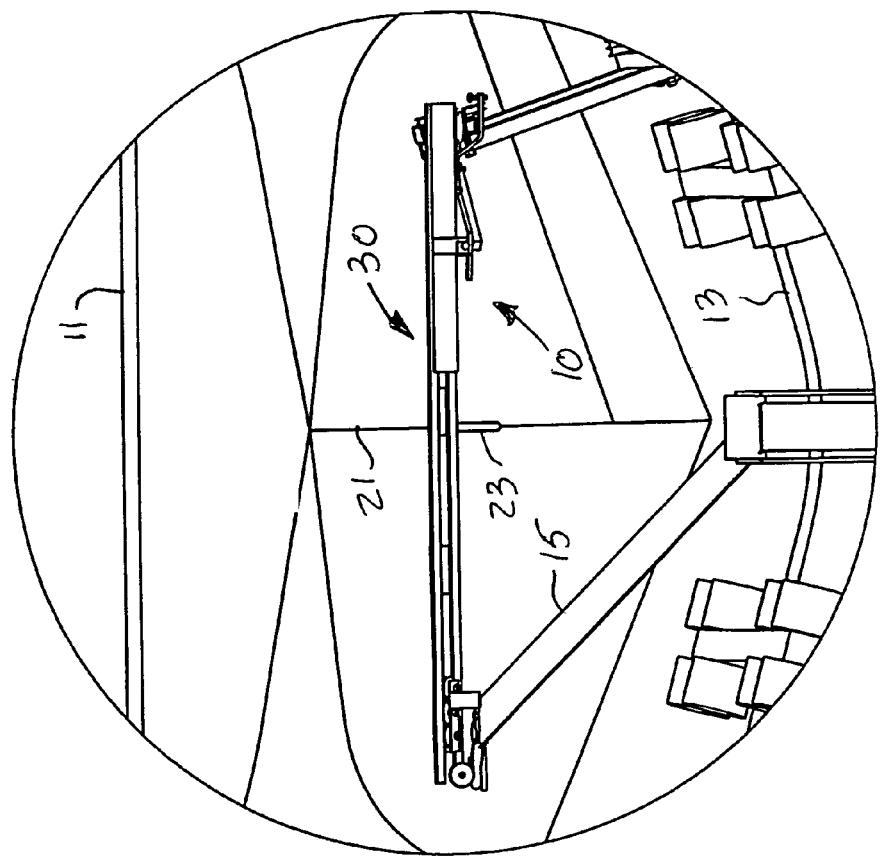
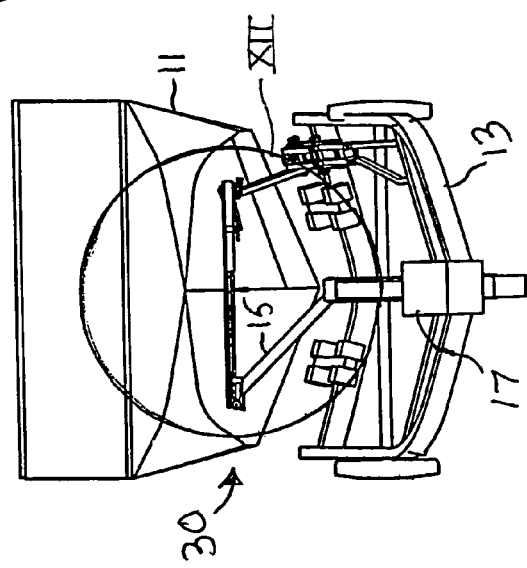

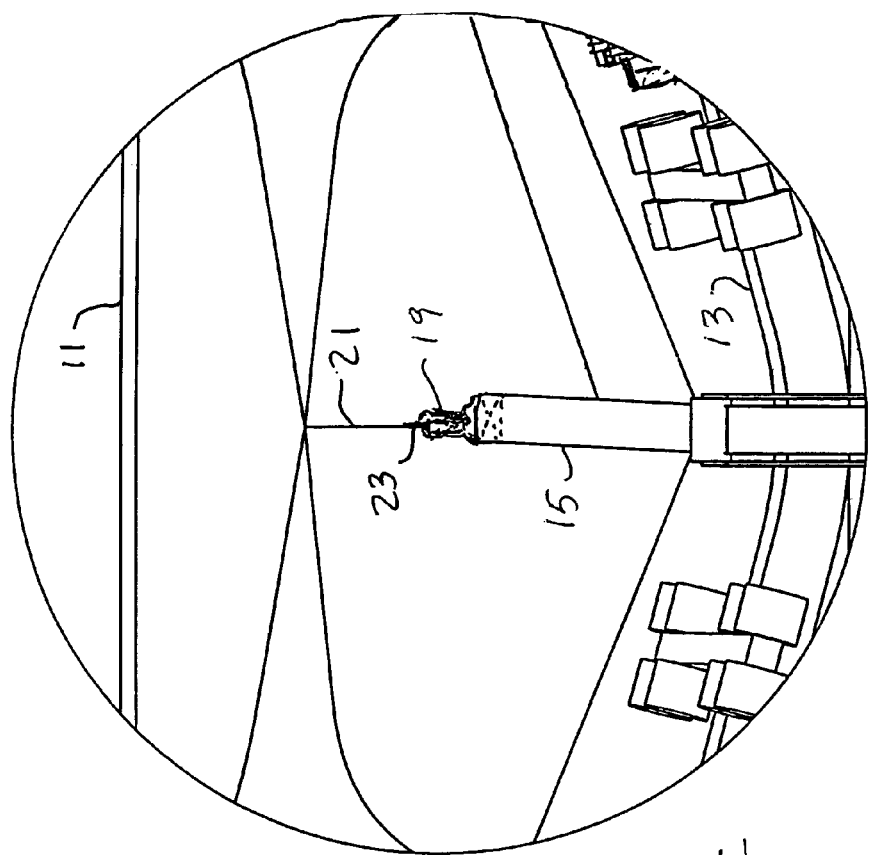
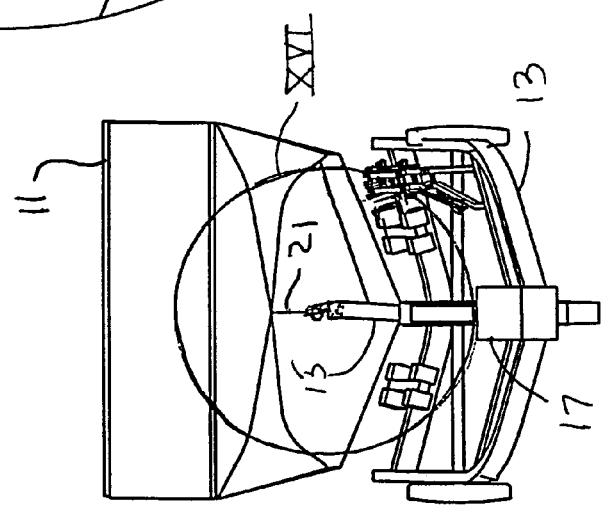

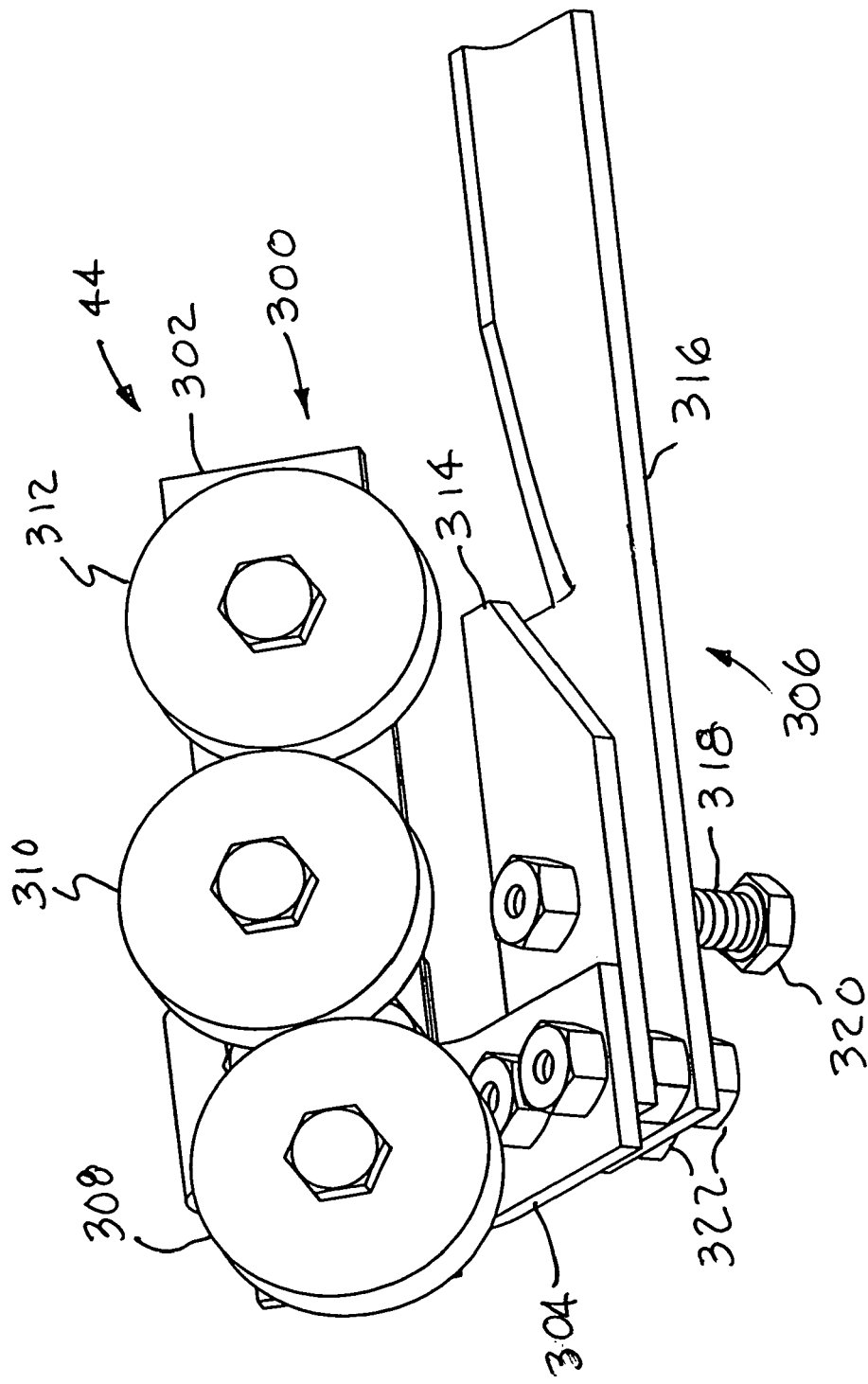

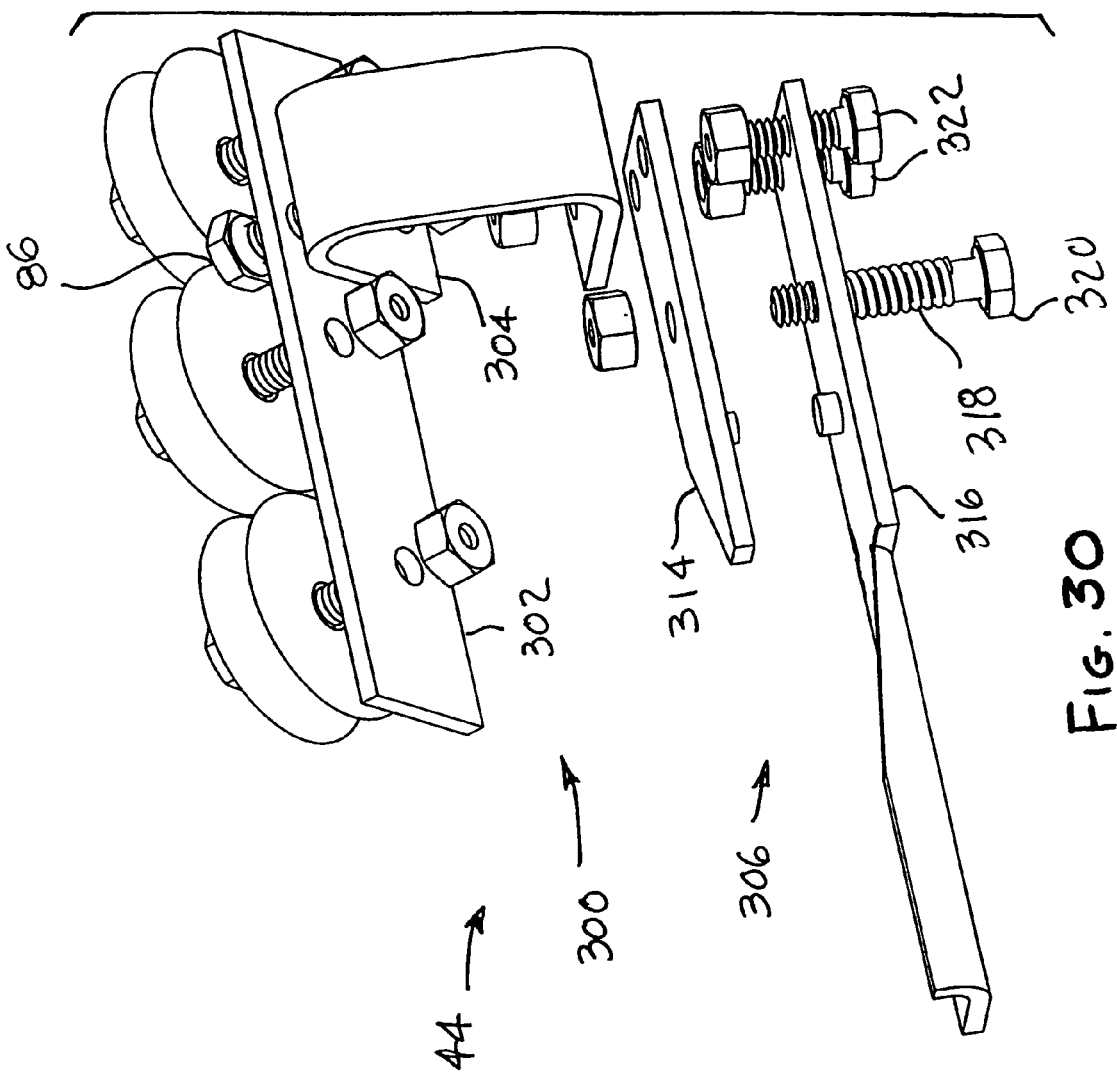

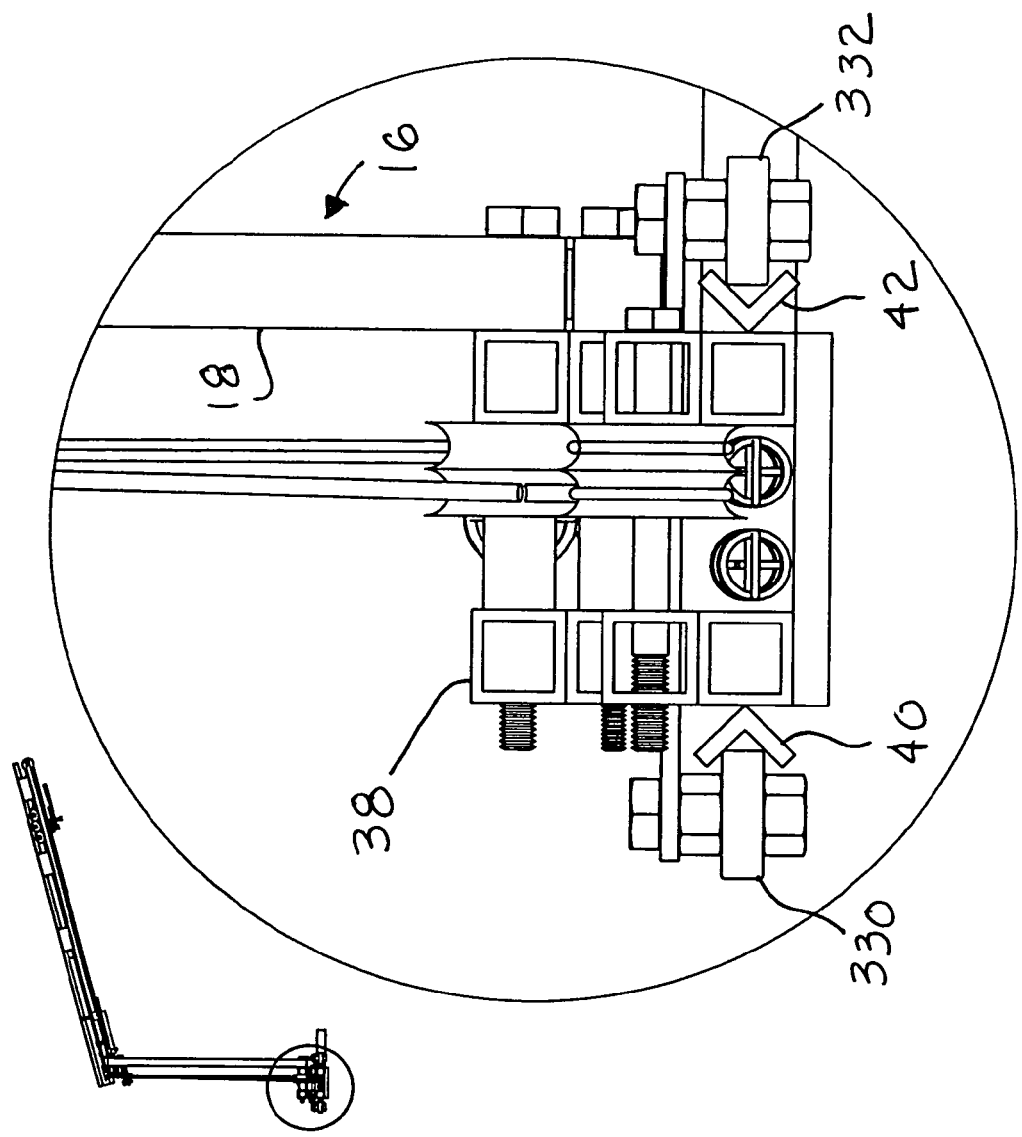

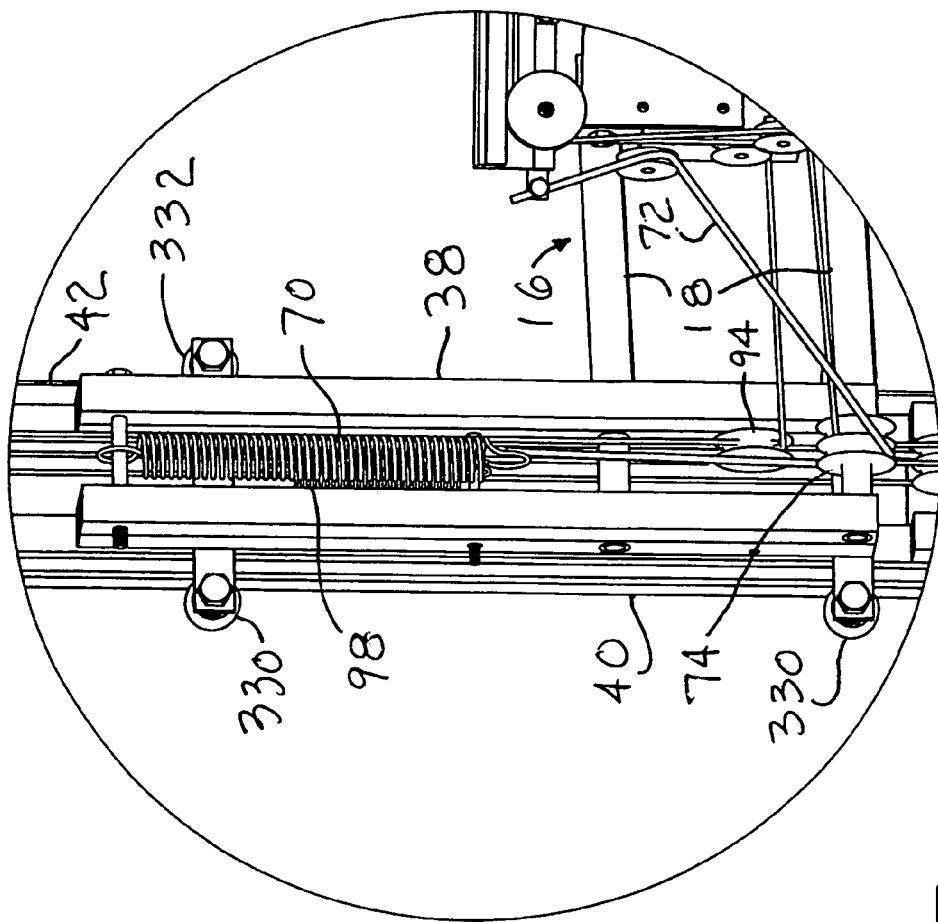
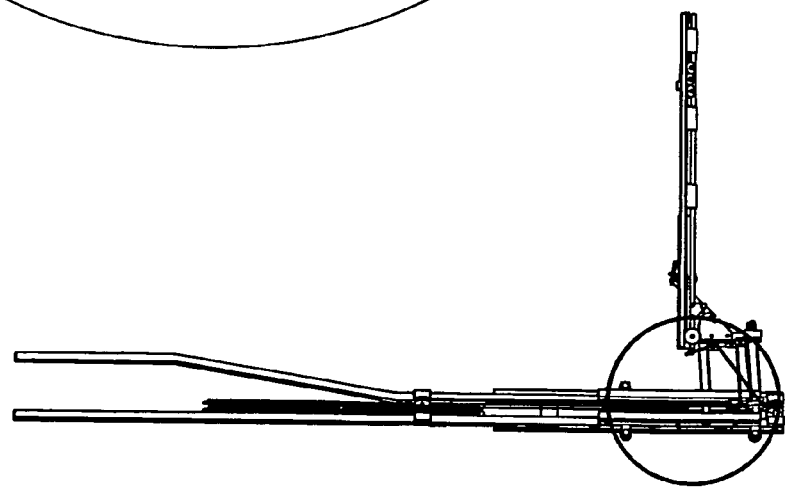

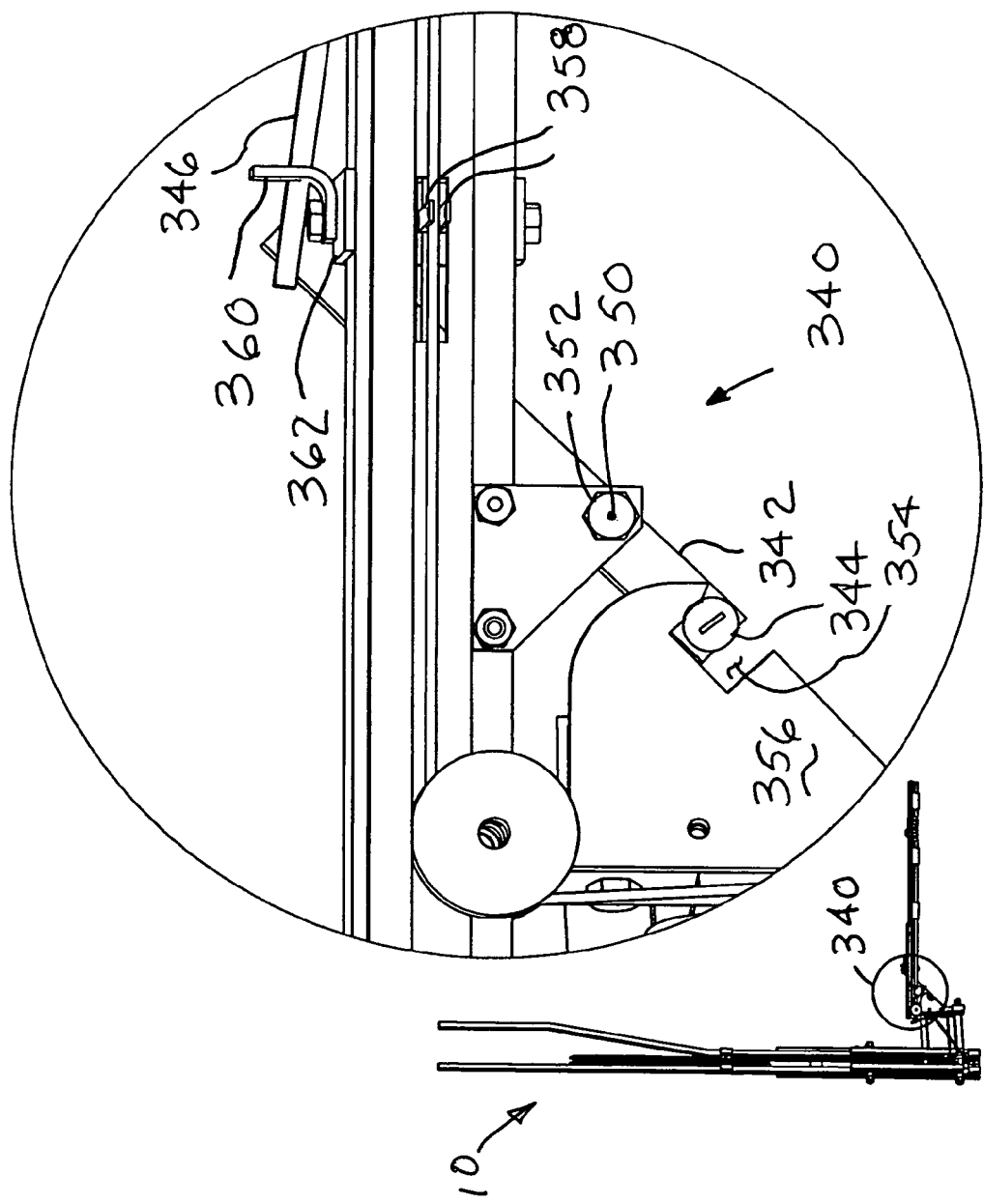

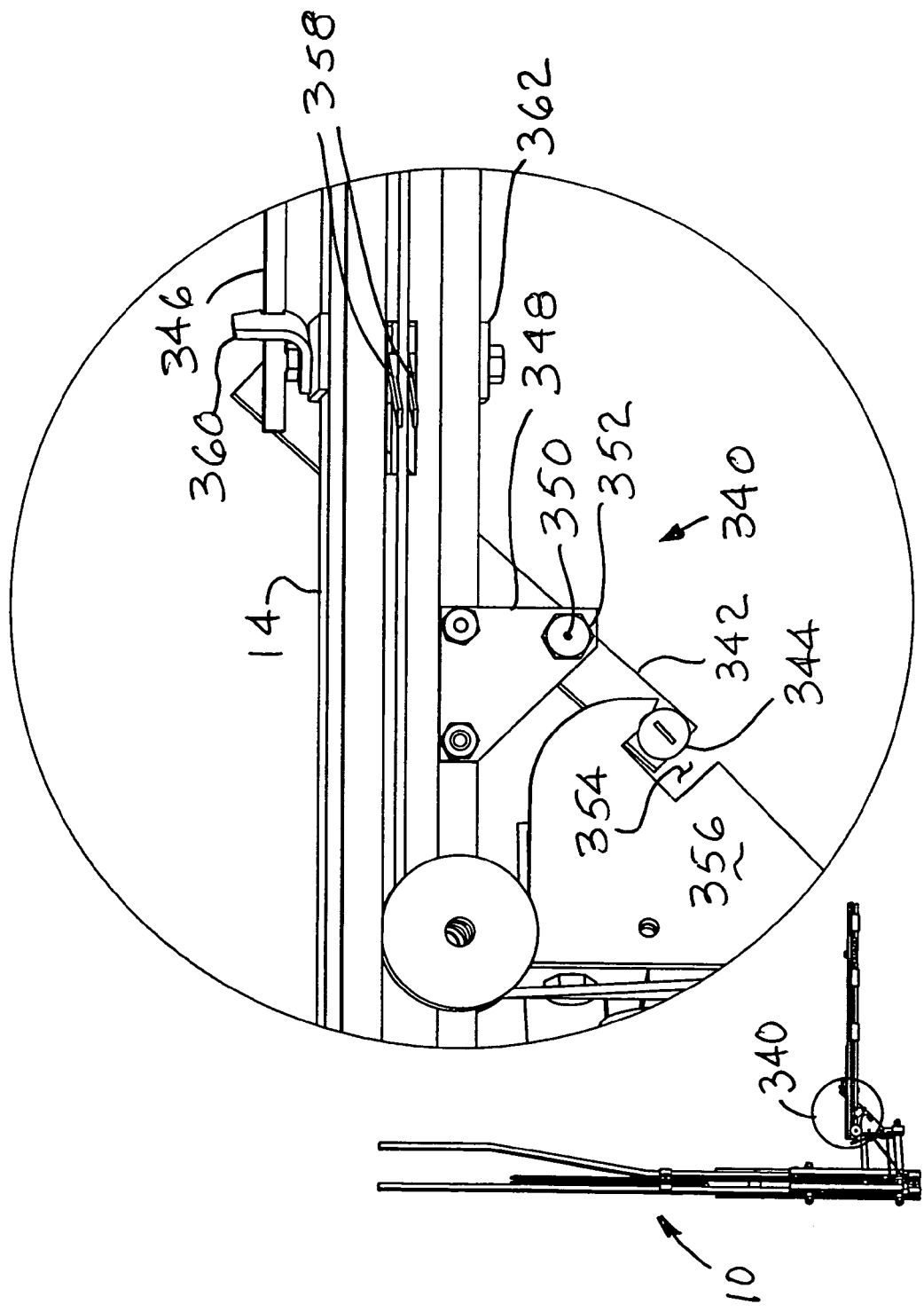

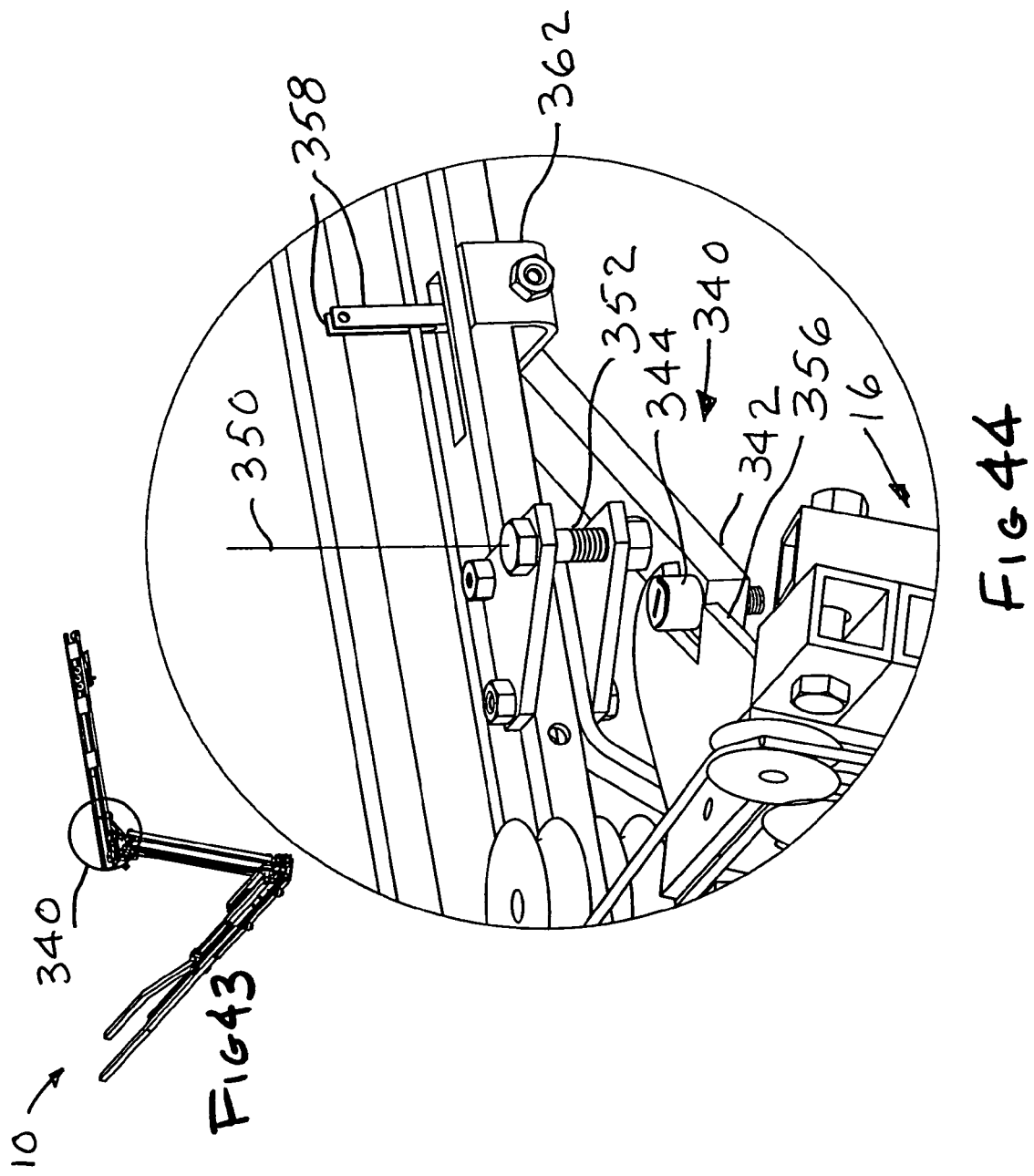

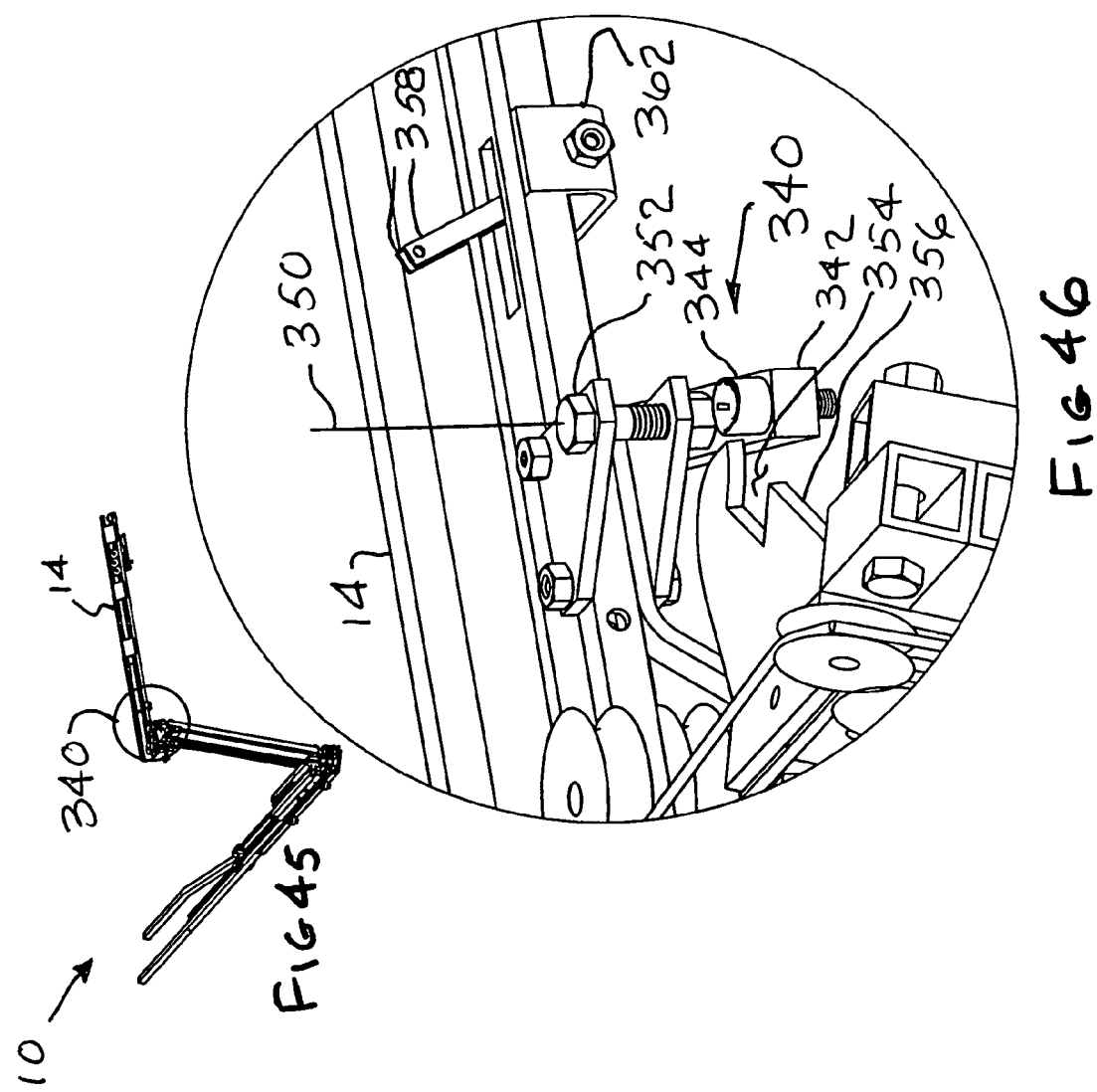

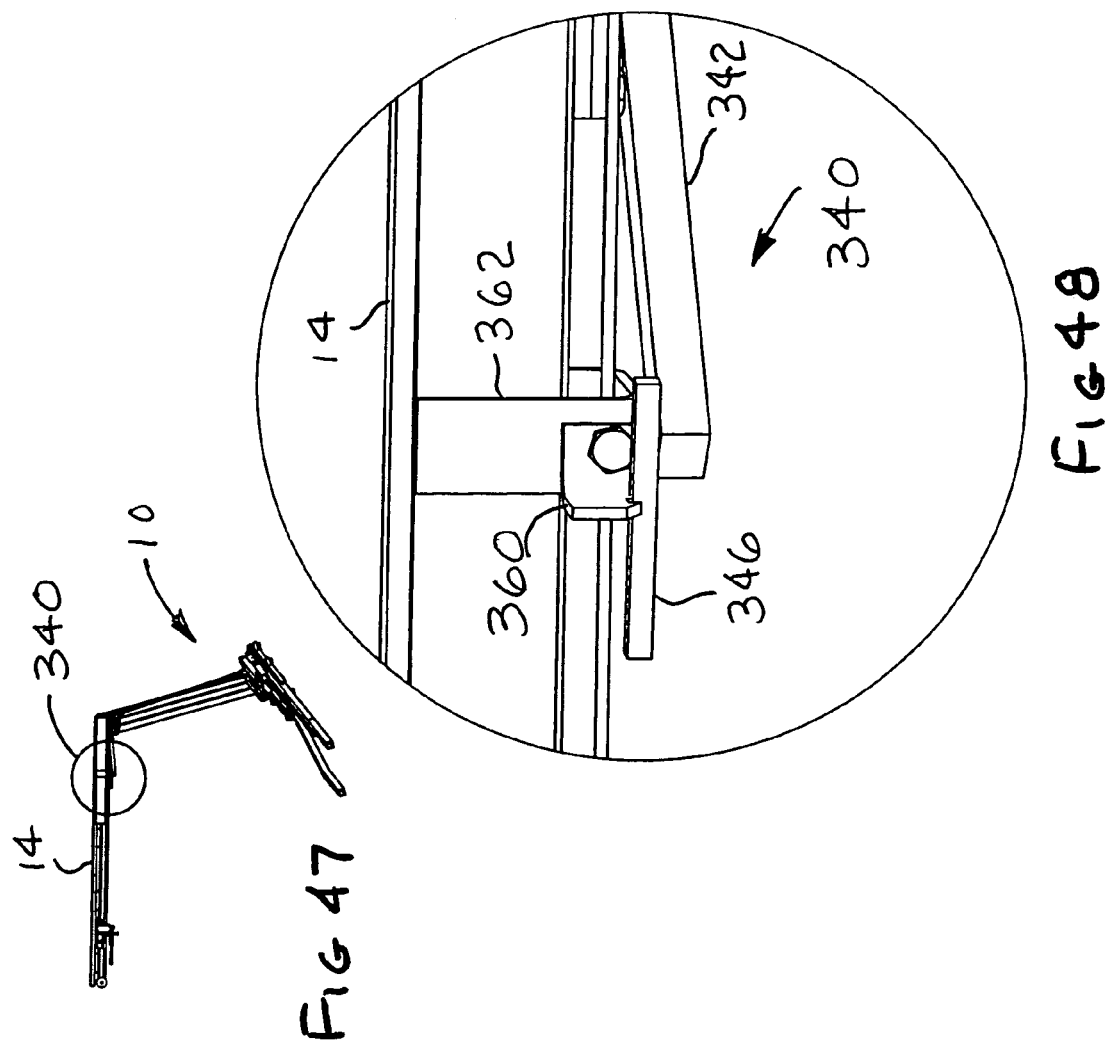

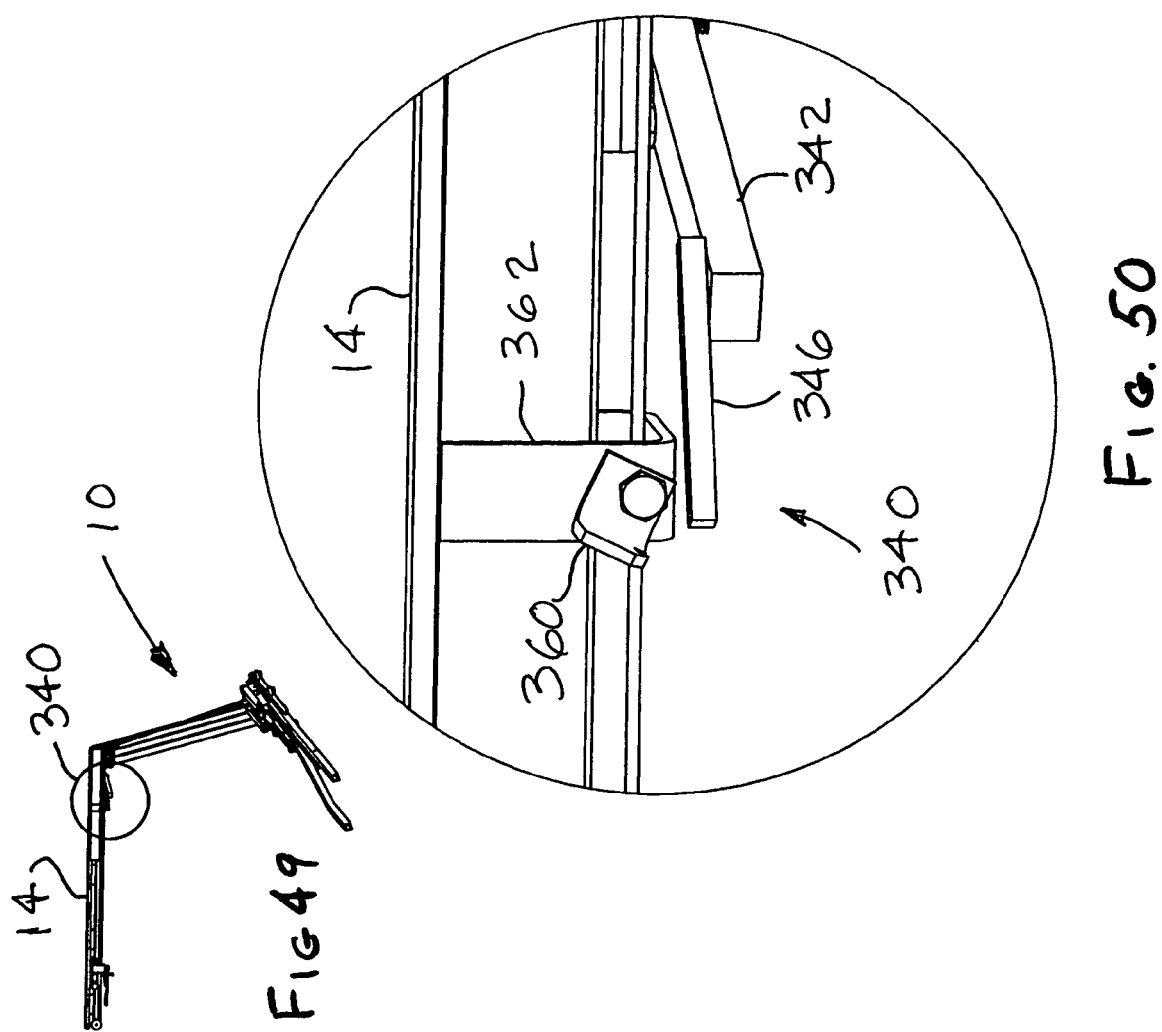

DOCKING SYSTEM

BACKGROUND OF THE INVENTION

This invention relates to retrieval of watercraft, more particularly, to a system to detect the presence of a watercraft and automatically attach a hook to an eye, such as a towing eye, on the prow or stem of the watercraft for retrieval of the watercraft, e.g., on a partially or fully submerged trailer or shore station, after which the watercraft can be drawn forward by a winch attached to the hook.

SUMMARY OF THE INVENTION

In one aspect, the present invention is an apparatus for retrieving a watercraft by automatically attaching a hook to an eye on a prow of the watercraft, wherein the apparatus includes a cross member having first and second ends, with a cross member support supporting and orienting the cross member both generally horizontally above a water level, and generally perpendicular to a direction of advance of the watercraft, with the cross member movable in response to contact with the watercraft moving in the direction of advance. The apparatus also includes a carriage movably mounted on the cross member and releasably carrying a hook, a first positioning member urging the carriage towards the first end of the cross member, and means for moving the carriage towards the second end of the cross member when the cross member is contacted and moved by the watercraft moving in the direction of advance such that the hook engages the eye on the prow of the watercraft as the watercraft moves in the direction of advance.

In another aspect, the present invention is a method of attaching a hook to an eye on a prow of a watercraft including positioning the hook on a carriage movably attached to a cross member positioned generally perpendicularly to a direction of advance of the watercraft, moving the carriage along the cross member in response to contact between the watercraft and the cross member, engaging the hook with the eye as the carriage moves along the cross member; and releasing the hook from the carriage after the hook is engaged with the eye.

BRIEF DESCRIPTION OF THE DRAWINGS

FIG. 1 is a simplified side view of the present invention, along with a watercraft and trailer, shown in a first position.

FIG. 2 is an enlarged view of detail II of FIG. 1.

FIG. 3 is a simplified side view similar to that of FIG. 1, except in a second position advanced from the first position.

FIG. 4 is an enlarged view of detail IV of FIG. 3.

FIG. 7 is a simplified side view similar to that of FIG. 5, except in a fourth position advanced from the third position.

FIG. 8 is an enlarged view of detail VIII of FIG. 7.

FIG. 9 is a simplified front view corresponding to that of FIG. 1, shown in the first position.

FIG. 10 is an enlarged view of detail X of FIG. 9.

FIG. 11 is a simplified front view corresponding to that of FIG. 3, shown in the second position.

FIG. 12 is an enlarged view of detail XII of FIG. 11.

FIG. 15 is a simplified front view corresponding to that of FIG. 7, shown in the fourth position.

FIG. 16 is an enlarged view of detail XVI of FIG. 15.

FIG. 29 is a perspective enlarged view of the tow hook cart from the side facing the watercraft.

FIG. 30 is an exploded perspective view of the tow hook cart from the side opposite that facing the watercraft.

FIG. 31 is a key to FIG. 32 showing the location of the detail of FIG. 32 in the first embodiment.

FIG. 32 is an enlarged detail end view of a support carriage useful in the practice of the present invention.

FIG. 35 is a key to FIG. 36 showing the location of the detail of FIG. 36 in the first embodiment.

FIG. 36 is an enlarged detail top view of the support carriage of FIG. 32.

FIG. 37 is a key to FIG. 38 showing the location of the detail of FIG. 38 in the first embodiment.

FIG. 38 is an enlarged detail top view of a latch mechanism useful in the practice of the present invention, shown in a latched position.

FIG. 39 is a key to FIG. 40 showing the location of the detail of FIG. 40 in the first embodiment.

FIG. 40 is an enlarged detail top view of the latch mechanism in a partially released position.

FIG. 43 is a key to FIG. 44 showing the location of the detail of FIG. 44 in the first embodiment.

FIG. 44 is an enlarged detail perspective view of the latch mechanism in the latched position.

FIG. 45 is a key to FIG. 46 showing the location of the detail of FIG. 46 in the first embodiment.

FIG. 46 is an enlarged detail perspective view of the latch mechanism in the fully released position.

FIG. 47 is a key to FIG. 48 showing the location of the detail of FIG. 48 in the first embodiment.

FIG. 48 is an enlarged detail rear view of the latch mechanism in the latched position.

FIG. 49 is a key to FIG. 50 showing the location of the detail of FIG. 50 in the first embodiment.

FIG. 50 is an enlarged detail rear view of the latch mechanism in the fully released position.

DETAILED DESCRIPTION OF THE INVENTION

Figure 5:
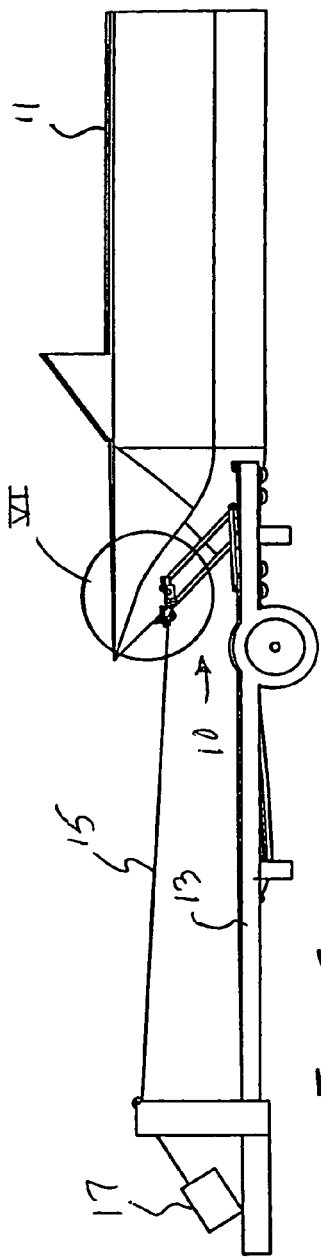
FIG. 5 is a simplified side view similar to that of FIG. 3, except in a third position advanced from the second position.
Figure 6:
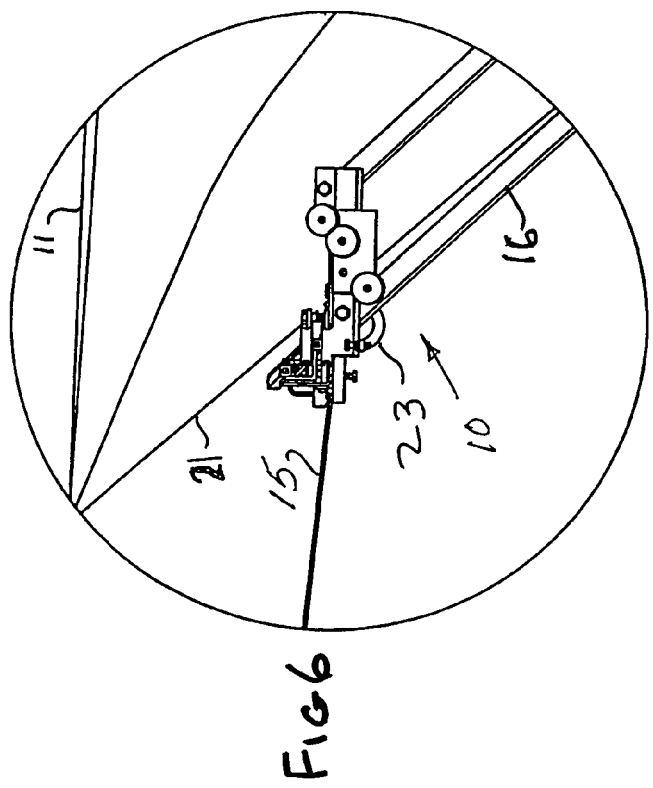
FIG. 6 is an enlarged view of detail VI of FIG. 5.
Figure 14:
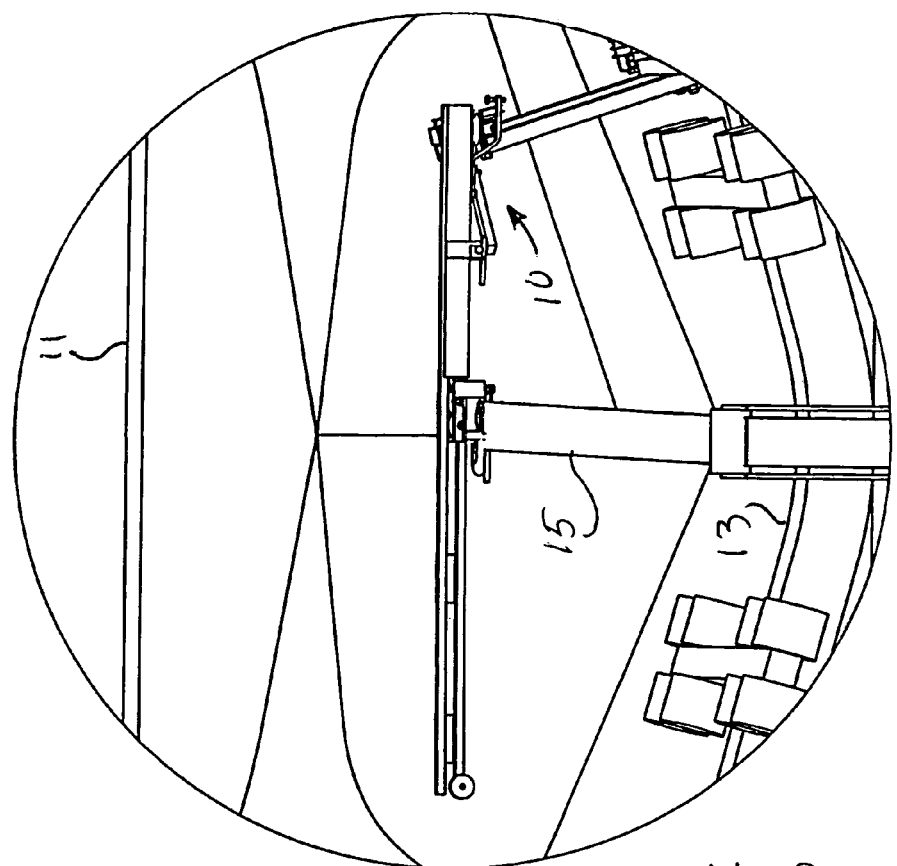
FIG. 14 is an enlarged view of detail XIV of FIG. 13.
Figure 13:
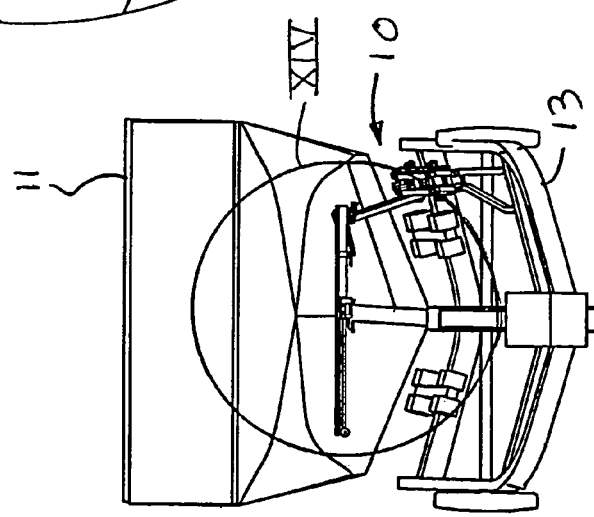
FIG. 13 is a simplified front view corresponding to that of FIG. 5, shown in the third position.
Figure 17:
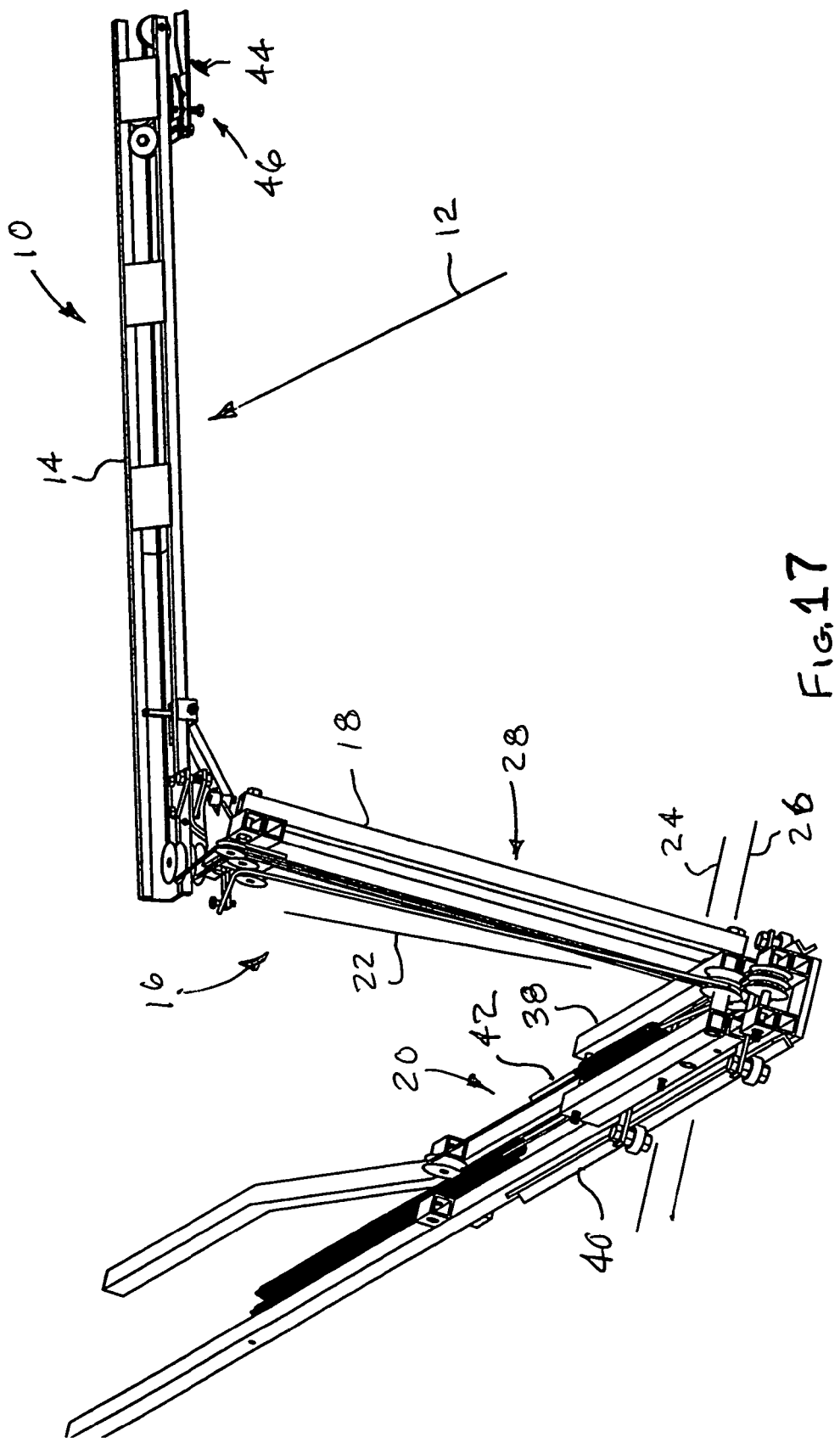
FIG. 17 is a perspective view of a first embodiment of a docking system apparatus of the present invention in the first position.

Referring now most particularly to FIGS. 1–21, a first embodiment of a docking system apparatus 10 of the present invention may be seen. FIGS. 1, 2, 9, 10 and 17 shows the apparatus 10 in a first position, at the moment when the apparatus first receives contact from a watercraft 11. FIG. 1 shows a side view of a trailer 13 on which the apparatus 10 may be mounted. FIG. 9 shows a front view of the apparatus 10, watercraft 11 and trailer 13. The view shown in FIG. 17 is a perspective view from above and to a side of the apparatus which is approached by a watercraft, preferably traveling along a direction of advance indicated by arrow 12.

In the first position, it is to be understood that the apparatus 10 has been previously prepared to have a strap or line 15 extended from a winch 17, with a tow hook 19 clipped into a tow hook cart on the apparatus 10 to prepare the apparatus 10 to receive and retrieve the watercraft 11 to a desired storage position on the trailer 13. It is to be understood that while the apparatus 10 is shown with trailer 13, apparatus 10 may be used in other environments with other equipment or structure to retrieve and store the watercraft 11. For example, and not by way of limitation, a slip or boat lift may have apparatus 10 installed for watercraft retrieval.

It is to be understood that apparatus 10 is shown in a first position 28 in FIGS. 1, 2, 9, 10, and 17, and will remain in that position in the absence of a watercraft. The apparatus 10 is sized and positioned to receive contact with a stem or bow edge 21 of a watercraft above a towing eye 23, with the watercraft having a conventional or positive slope to the stem 21; i.e., a positive slope of the stem 21 results in an overhanging condition wherein the watercraft will urge the apparatus 10 along the stem 21 towards the towing eye 23. The first position 28 may be considered a "ready" or initial position.

As the watercraft 11 approaches and contacts the apparatus 10, the apparatus 10 is driven to a second position 30, shown in FIGS. 3, 4, 11, 12 and 18. In the second position 30, the stem 21 of watercraft 11 has advanced against apparatus 10 until apparatus 10 is in contact with the towing eye 23. Movement from the first position to the second position results in angular movement (indicated by arrow 34 in FIGS. 3 and 18) of a generally upright structure 16 of the apparatus 10 to the second position 30 shown in FIGS. 3, 4 and 18. In the first position 28 and during movement up to and including the second position 30, the strap 15 and towing hook 19 and a towing hook cart 44 remain at a distal end 25 of the apparatus 10, as shown most clearly in FIGS. 11, 12 and 18. In the second position, the apparatus 10 is in contact with the stem 21 of the watercraft 11 with a cross arm 14 in initial contact with the towing eye 23.

Referring now most particularly to FIGS. 5, 6, 13, 14, and 19, as the watercraft progresses against apparatus 10, contact between the towing eye 23 and the cross member or cross arm 14 prevents further rotation of apparatus 10 in the direction of arrow 34, and a support carriage 38 will be driven by the advance of the watercraft 11 to move the upright structure 16 and cross arm 14 in the direction indicated by arrow 36 (see FIGS. 5 and 19), typically generally parallel to the direction of advance of the watercraft indicated by arrow 12. The advance of the support carriage 38 will cause the tow hook cart 44 to move in a transverse direction from a first position 46 of the cart 44 to a second position 48 of the cart 44 at which time the tow hook 19 engages the towing eye 23. The apparatus 10 is now in the third position, wherein the apparatus 10 is advanced from the second position and the hook 19 (connected to the winch 17 by strap 15) is engaged with the eye 23 on the watercraft 11.

Figure 19:
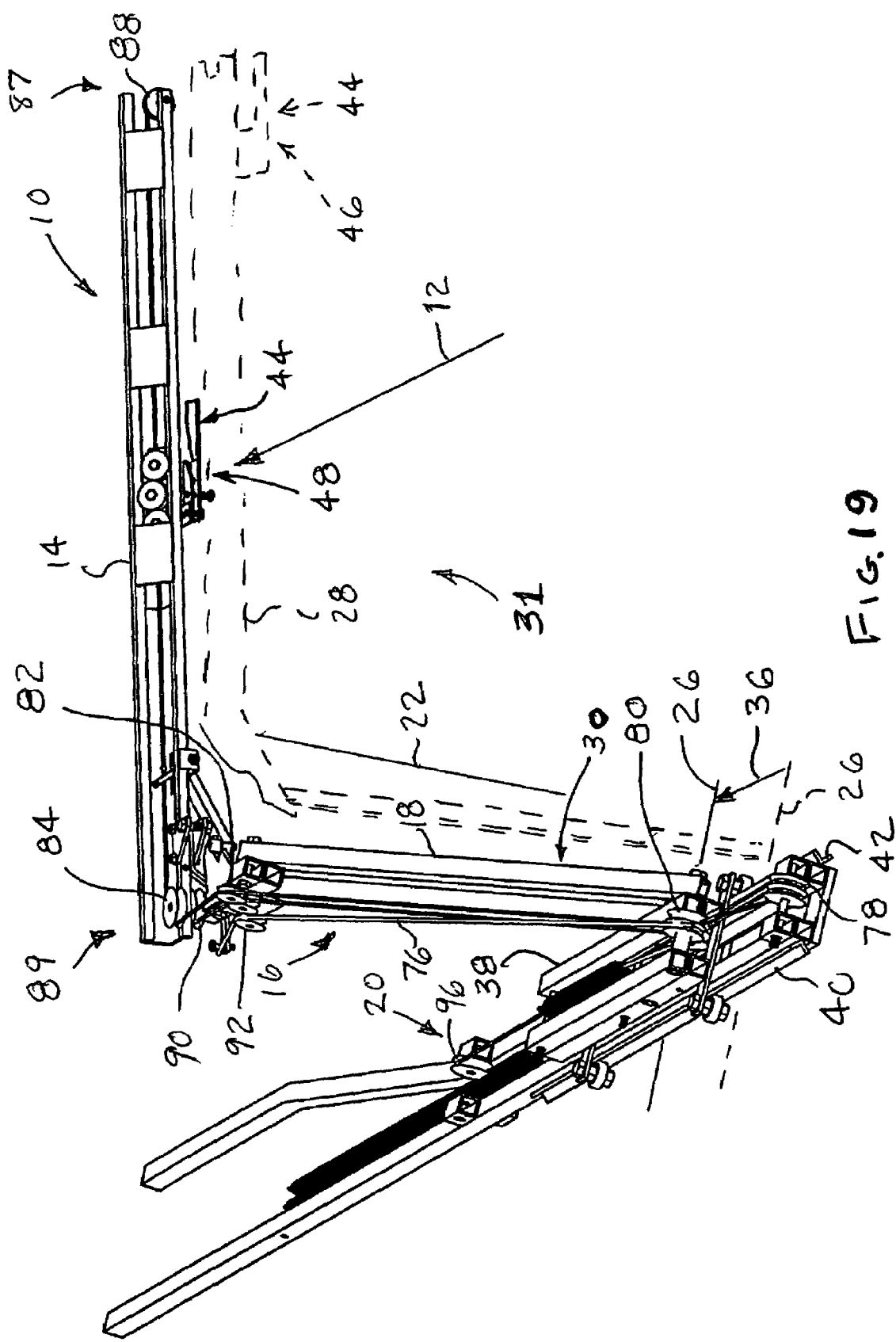
FIG. 19 is a view similar to that of FIG. 18, except with the docking system apparatus in the third position, advanced from the second position.

Further advance of the watercraft 11 in the direction indicated by arrow 12 drives the tow hook cart 44 further along the cross arm 14 in the direction of the generally upright structure 16, releasing the cart 44 from the hook 19. After release of the hook 19 from the cart 44, the cross arm 14 will move out of the way, as indicated by arrow 50 in FIG. 19. In FIG. 19, the apparatus 10 is shown in an intermediate position 33, between the second position 30 and a fourth position 54 (shown in FIGS. 7, 8, 15, 16, and 21. The fourth position 54 is a storage position for the apparatus 10. The upright structure 16 of apparatus 10 moves in the direction of arrow 34 as the apparatus 10 moves from the intermediate position 33 shown in FIG. 20 and the fourth position 54, shown in FIG. 21.

Figure 18:
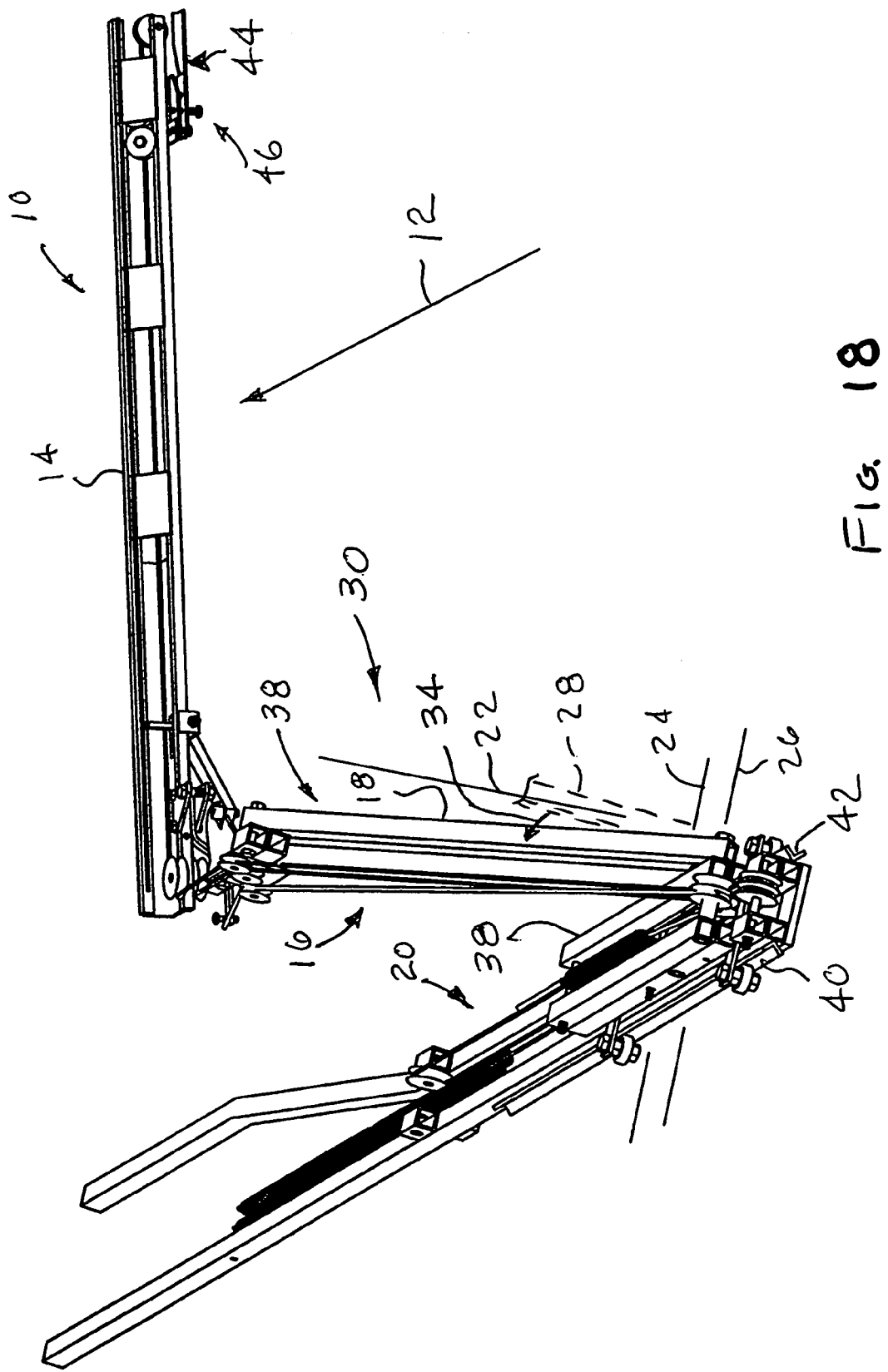
FIG. 18 is a view similar to that of FIG. 17, except with the docking system apparatus in the second position, advanced from the first position.

Referring now most particularly to FIGS. 17–21, apparatus 10 includes the cross member or cross arm 14 (shown in a generally horizontal position) supported by the generally upright structure 16 in the form of a parallelogram 18, which in turn is supported on a support and storage assembly 20, (which is also shown in a generally horizontal position, but at about a right angle to cross member 14 in FIGS. 17–19). It is to be understood that assembly 20 is typically mounted to a longitudinal member of the trailer 13, and in operation, assembly 20 may be inclined and parallel to a ramp on which the trailer is located for recovery of the watercraft 11. Alternatively, the assembly 20 may be mounted and oriented in another fashion when the watercraft 11 is to be recovered in a setting other than with a trailer 13.

In FIG. 17, the vertical direction is indicated by line 22. The parallelogram 18 is arranged to pivot (in a direction indicated by arrow 34) about axes 24 and 26 from a first position 28 (shown in FIG. 17) inclined slightly forward of vertical in a direction opposite to that of arrow 12, to the second position 30 (shown in FIG. 18) inclined slightly rearward of vertical in the direction indicated by arrow 12, and finally to a fourth position 54 (shown in FIG. 21) nearly horizontal and generally parallel to the support and storage assembly 20. It is to be understood that parallelogram 18 remains in a position 30a during the third and intermediate positions 31 and 33 of apparatus 10. Position 30a corresponds to the angular position that parallelogram 18 takes in the second position 30.

Referring now most particularly to FIGS. 18 and 19, as described above, when the watercraft 11 advances and contacts the cross member 14, the cross member 14 will follow the rotation of parallelogram 18 until cross member 14 contacts the bow eye 23 of the watercraft 11, after which the watercraft 11 will drive the cross member 14 and parallelogram 18 in the direction of advance 12, moving the cross member 14 and parallelogram 18 along the assembly 20, as indicated by arrow 36 in FIG. 19. It is to be understood that the upright structure 16 and parallelogram 18 are supported on the support carriage 38 which is free to move along a pair of rails 40 of the support and storage structure 20.

Once the watercraft contacts the cross member 14 and advances to where the bow eye 23 is also in contact with the cross member 14, further movement of the watercraft in the direction of advance 12 results in movement of the support carriage 38, as indicated by arrow 36. Movement of carriage 38 draws the tow hook cart 44 along cross member 14, from the first position 46 of the cart 44 (shown in FIGS. 17 and 18) to the second position 48 as indicated in FIG. 19. It is to be understood that the position 48 shown in FIG. 19 corresponds to a condition wherein the tow hook 19 is driven into engagement with the bow eye 23 of the watercraft 11 after which the hook 19 is released from the tow hook cart 44.

Figure 20:
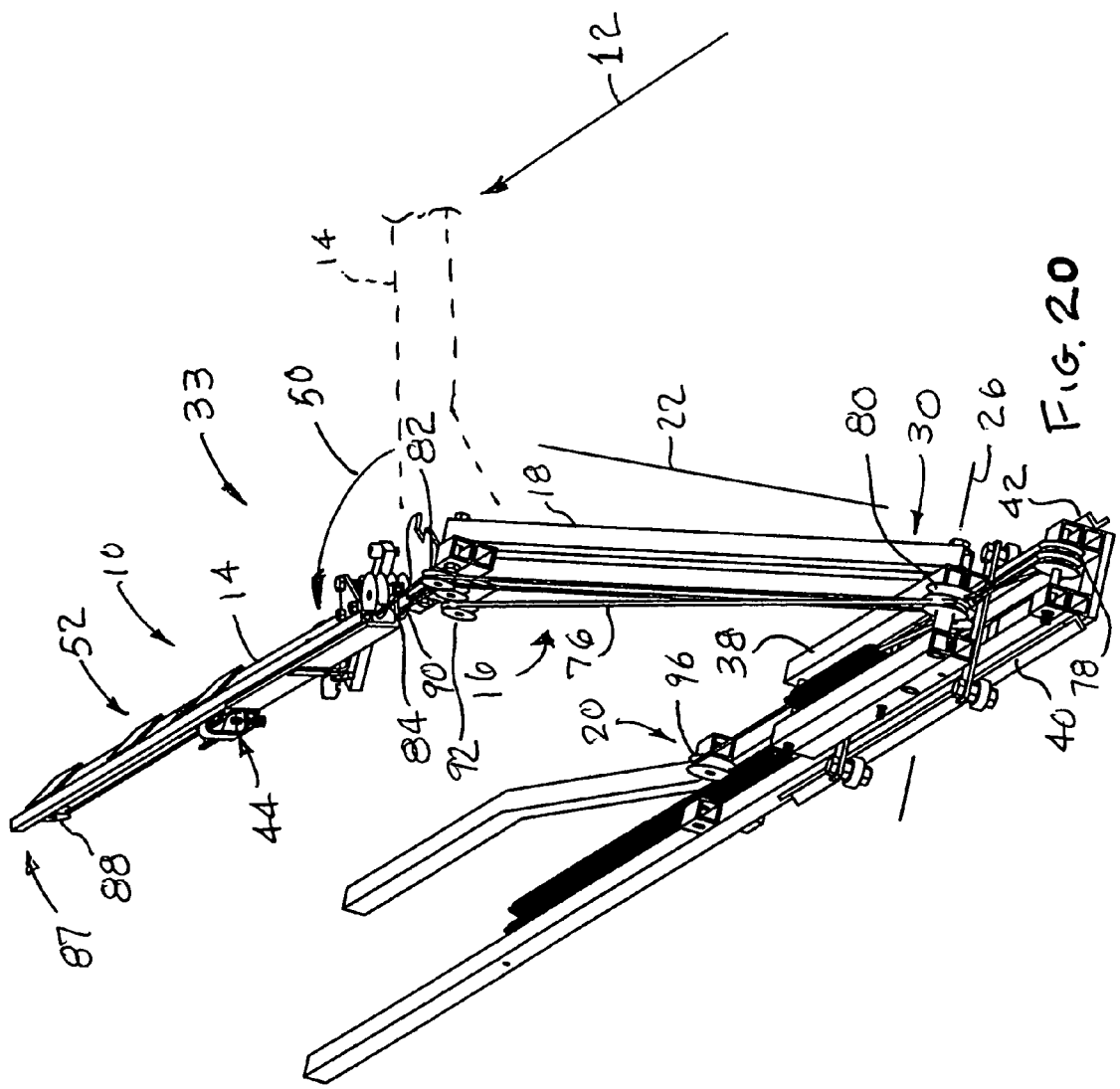
FIG. 20 is a view similar to that of FIG. 19, except with the docking system apparatus in an intermediate position, advanced from the third position.
Figure 21:
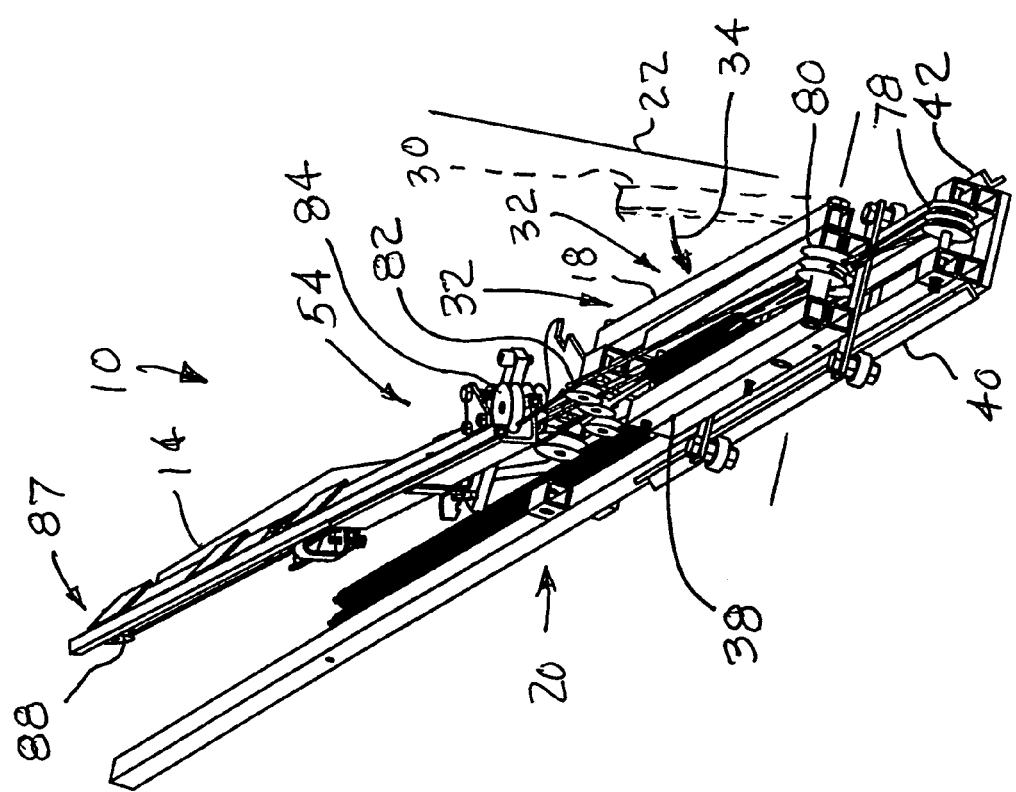
FIG. 21 is a view similar to that of FIG. 20, except with the docking system apparatus in a fourth position, advanced from the intermediate position.

Once the tow hook 19 is engaged with the bow eye 23 and released from the tow hook cart 44, the cross arm 14 pivots along arrow 50 to the position 52 shown in FIG. 20, and the docking system apparatus continues to move from the intermediate position 33 shown in FIG. 20 to the storage position 54, as shown in FIG. 21 in which both the cross arm 14 and the upright structure 16 are collapsed and generally aligned with the support and storage assembly 20.

Figure 22:
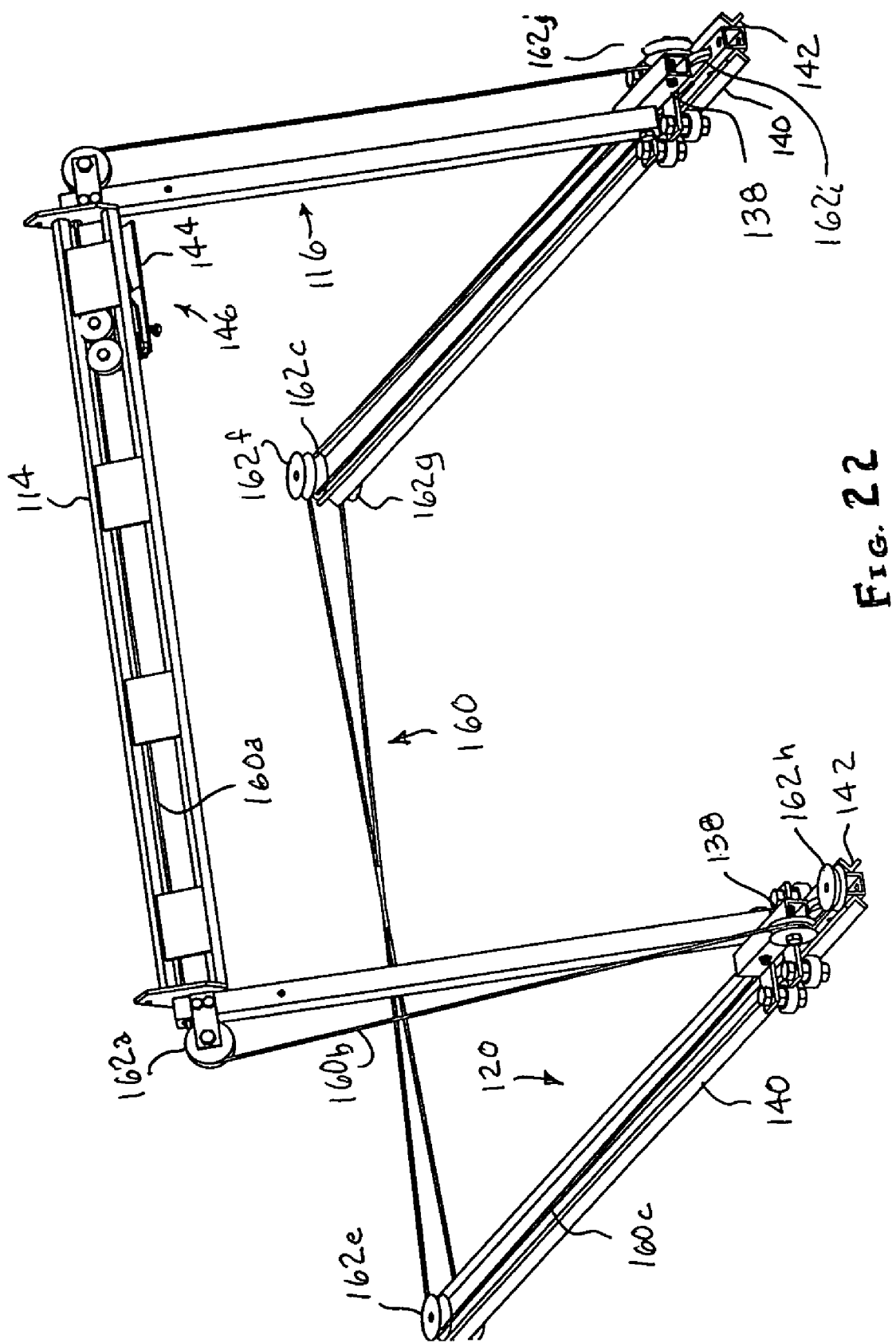
FIG. 22 is a view of a second embodiment shown in the first position.
Figure 23:
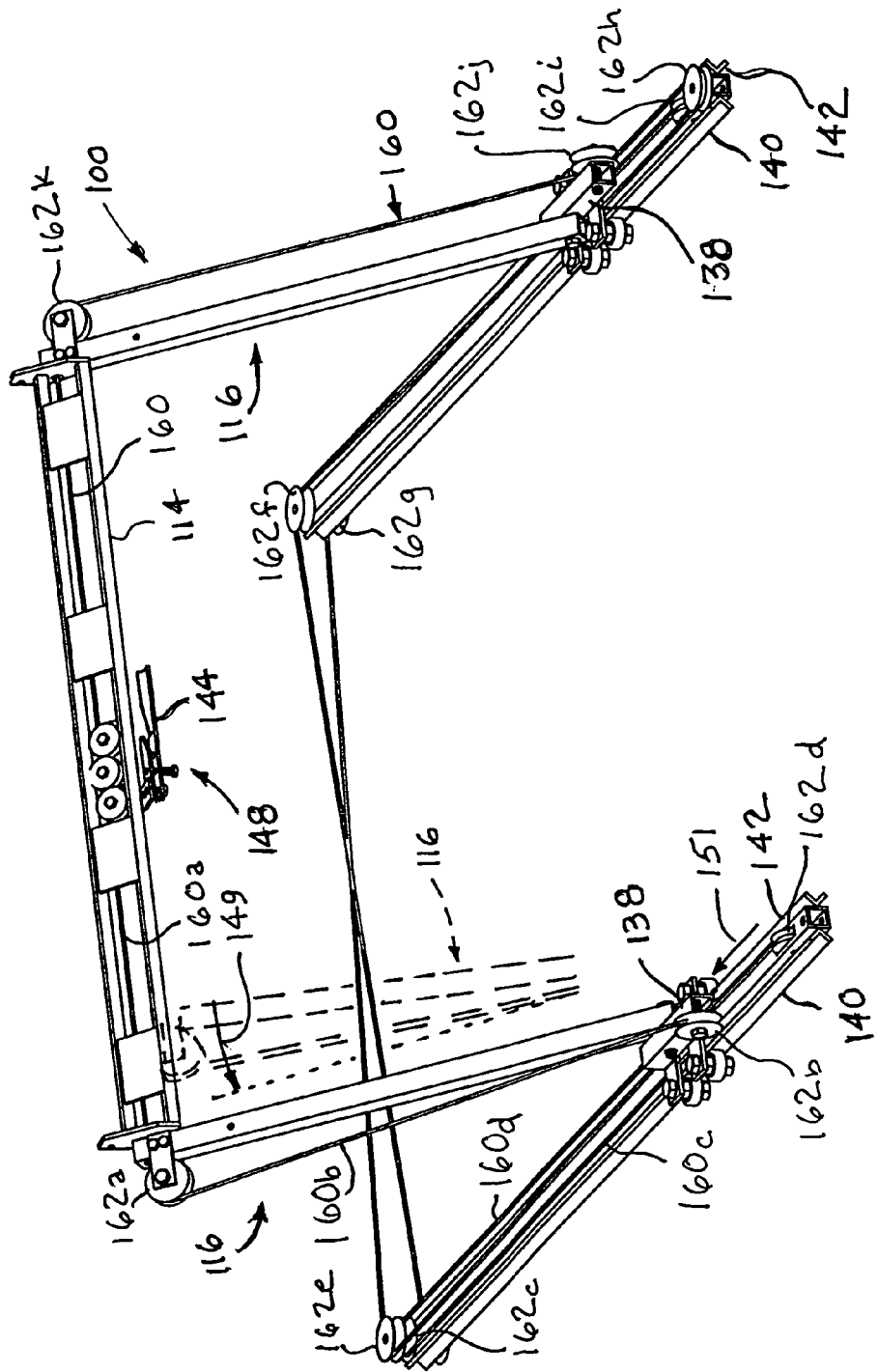
FIG. 23 is a view similar to that of FIG. 22, except with the docking system apparatus of the second embodiment in the third position, advanced from the first position.
Figure 24:
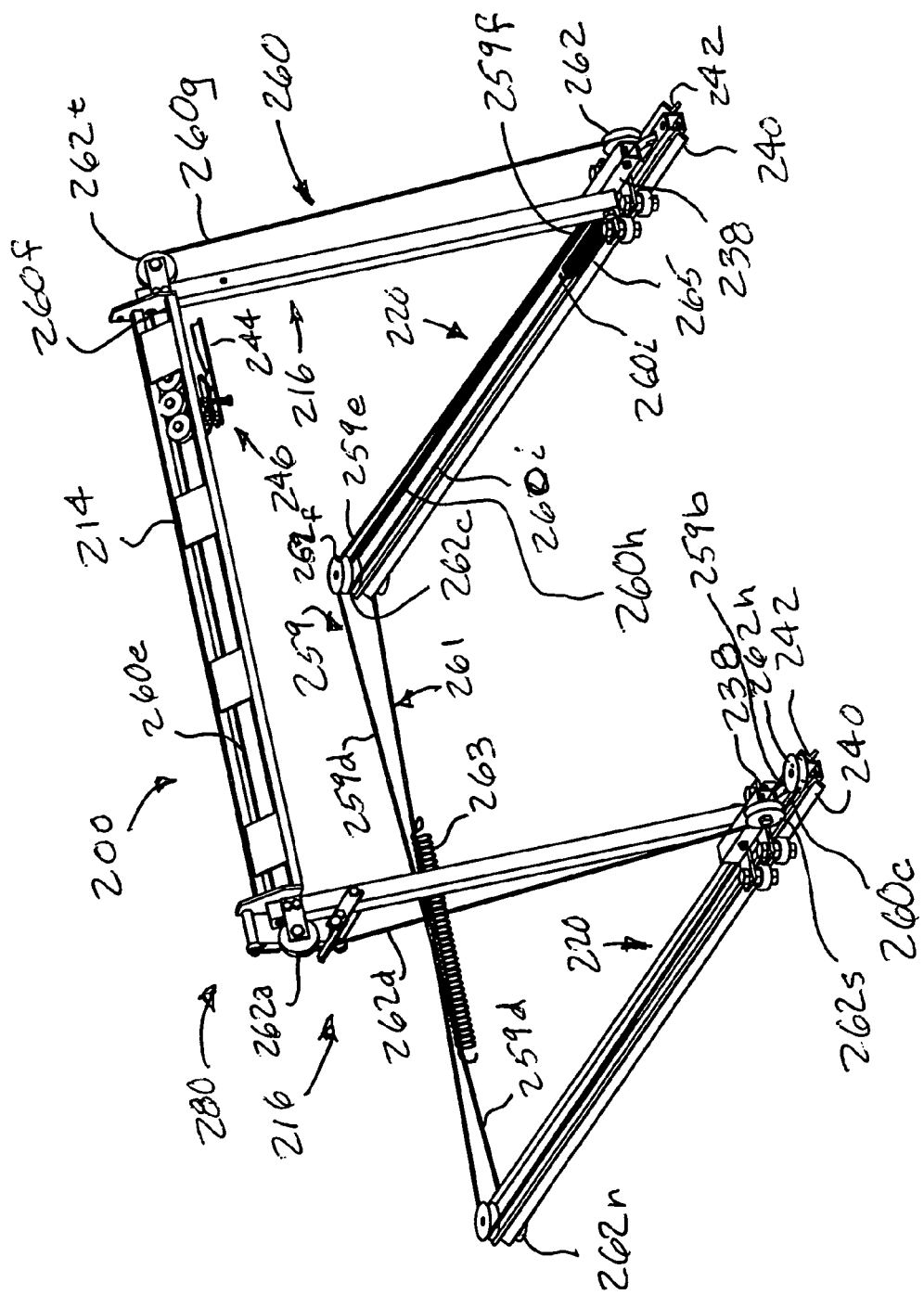
FIG. 24 is a view of a third embodiment shown in the first position.
Figure 25:
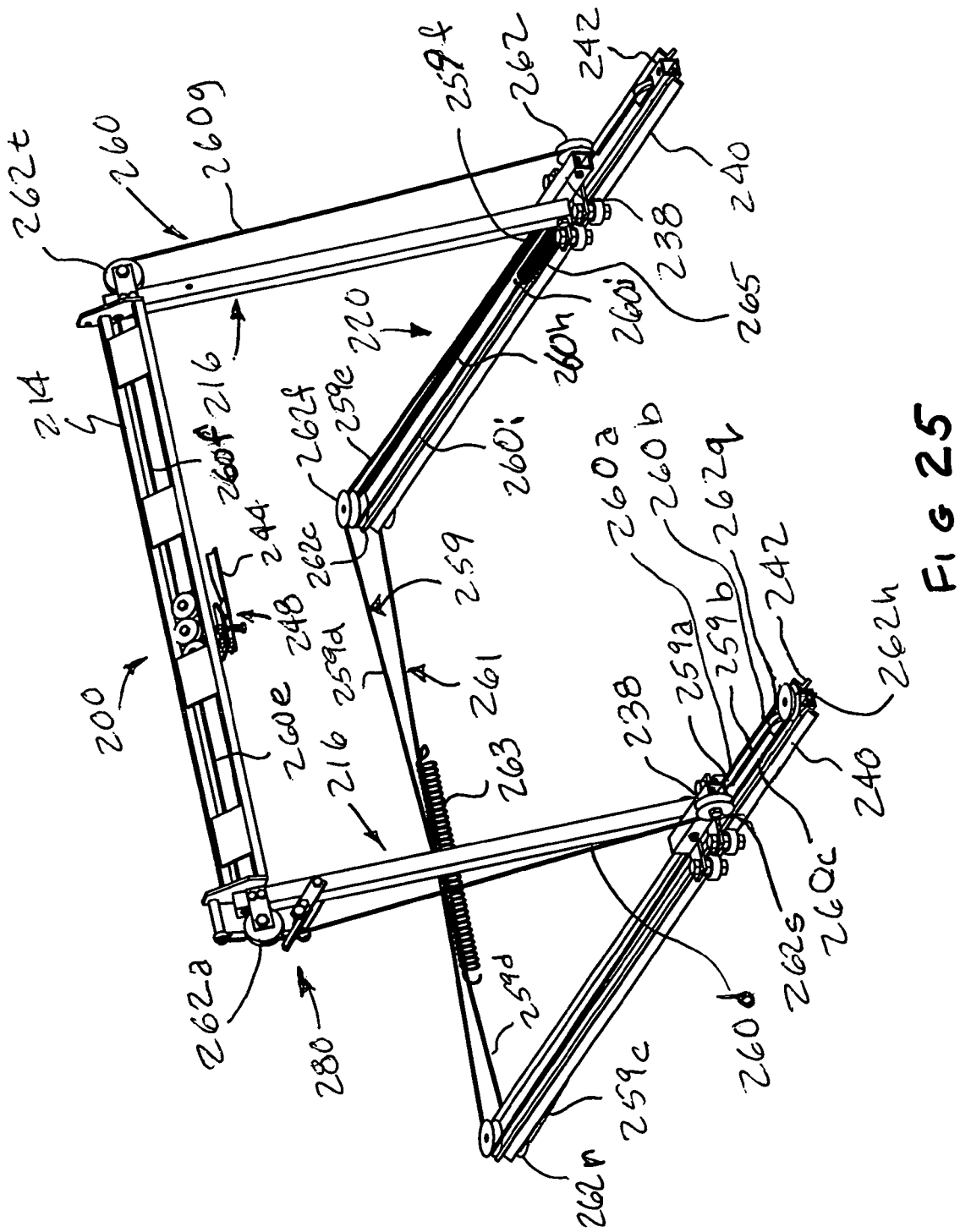
FIG. 25 is a view similar to that of FIG. 24, except with the docking system apparatus of the third embodiment in the third position, advanced from the first position.

Referring now to FIGS. 22 and 23, a second embodiment 100 of the docking system apparatus of the present invention may be seen. In this embodiment, parts corresponding to similar or identical parts in the first embodiment are identified by reference numbers incremented by 100. In this embodiment a pair of generally upright structures 116 support cross member 114 which carries tow hook cart 144, shown in a first position 146 in FIG. 22. A pair of support carriages 138 are free to move along rails 140 and 142 on each side of the apparatus 100. When the bow of a watercraft contacts cross member 114, upright structures 116 and cross member 114 rotate as indicated by arrow 149 until the bow eye comes into contact with cross member 114. Once cross member 114 is in contact with the bow eye, the upright structures 116 and cross member 114 will move along rails 140, 142 in the direction indicated by arrow 151. As the cross member and upright structures move in the direction indicated by arrow 151, the tow hook cart 144 will be moved along the cross member 114, as indicated by a comparison of FIG. 23 with FIG. 22. Once the tow hook is engaged with the bow eye at a second position 148, the cross member 114 and upright structures 116 continue to be driven by the watercraft in the direction indicated by arrow 151. Optionally an electrically powered winch may be energized after the tow hook is engaged with the bow eye, and the winch may be operated until the watercraft is fully advanced to a desired position at which time a limit switch may be used to shut off the winch. In an alternative embodiment, a manually operated winch may be used. It is to be understood that the latch mechanism is frictionally attached to the cable, so when the tow rope becomes taut, it pulls the latch mechanism ahead of the watercraft, so that it is not in contact thereafter.

Referring now to FIGS. 24–28, a third embodiment 200 of the docking system apparatus of the present invention may be seen. In this embodiment, parts corresponding to similar or identical parts in the first embodiment are identified by reference numbers incremented by 200. In this embodiment a pair of generally upright structures 216 support cross member 214 which carries tow hook cart 244, shown in a first position 246 in FIG. 24. A pair of support carriages 238 are free to move along rails 240 and 242 on each side of the apparatus 200. A first cable 259 is connected between support carriages 238 as follows. Cable 259 is attached at a first end 259a to carriage 238 on the left side. Cable segment 259b extends from end 259a to a pulley 262q. Cable segment 259c extends from pulley 262h to pulley 262r. Cable segment 259d extends from pulley 262r to 262f. Cable segment 259e extends from pulley 262f to a second end 259f attached to the support carriage 238 on the right hand side. A second cable 261 is attached in a mirror image arrangement to cable 259. Spring 263 is attached to each cable 259 and 261 such that as the support carriages 238 move forward, the spring 263 increases tension and keeps an even amount of tension on both cables 259 and 261. The spring 263 is connected between cables 259 and 261. When support carriages 238 move forward, spring 263 is tensioned due to the movement of segment 259d of cable 259 and the corresponding segment of cable 261, which move apart, extending spring 263. Spring 263 provides the motive force to reset the support carriages 238 to a position ready to receive a watercraft, after the cross member 214 and upright members 216 are raised manually and the tow hook 19 inserted into a clamp 306 (see FIG. 30) of the tow hook cart 244.

A third cable 260 holds the cross member 214 and upright structures 216 up and brings the tow hook cart 244 across member 214. Cable 260 has a first end 260a connected to the left hand support carriage 238. Cable segment 260b extends from first end 260a to pulley 262h. Cable segment 260c extends from pulley 262h to pulley 262s. Cable segment 260d extends from pulley 262s to pulley 262a. Cable segment 260e extends from pulley 262a to the tow hook cart 244, where it is attached. It is also to be understood that cable segment 260d passes through a pair of fingers in a cross member latch 280. Cable segment 260f extends from cart 244 to pulley 262t. Cable segment 260g extends from pulley 262t to pulley 262. Cable segment 260h extends from pulley 262 to pulley 262c. Cable segment 260i extends from pulley 262c to a second end 260j fastened to a spring 265 which is attached to the right hand support carriage 238. Spring 265 keeps tension in cable 260, and together they operate to maintain the structures 216 upright.

Initially apparatus 200 operates very similarly to apparatus 100. When the bow of a watercraft contacts cross member 214, upright structures 216 and cross member 214 rotate similarly as shown in FIG. 23 until the bow eye comes into contact with cross member 214. Once cross member 214 is in contact with the bow eye, the upright structures 216 and cross member 214 will move along rails 240, 242 similarly as shown in FIG. 23. As the cross member and upright structures move along rails 240 and 242, the tow hook cart 244 will be moved along the cross member 214, as indicated by a comparison of FIG. 25 with FIG. 24. At this point the tow hook carried by cart 244 will engage the bow eye, and the winch (not shown) may be automatically or manually activated to take us slack in the tow rope, and to draw the watercraft to the intended final position. Meanwhile, as the watercraft advances, the cart 244 will continue advancing along cross member 214, as shown in FIG. 26.

Figure 26:
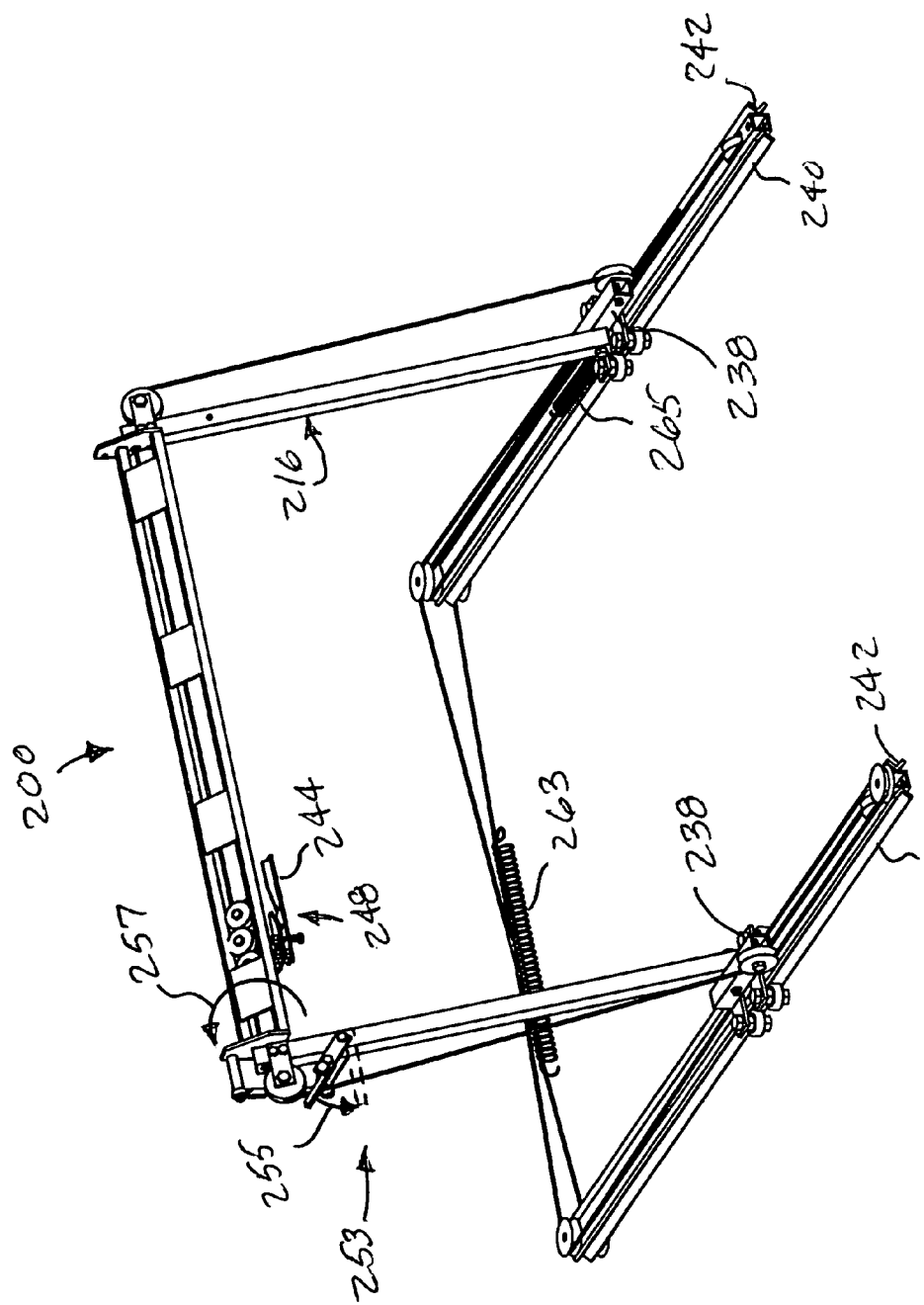
FIG. 26 is a view similar to that of FIG. 25, except with the docking system apparatus of the third embodiment in a first intermediate position, advanced from the third position.
Figure 27:
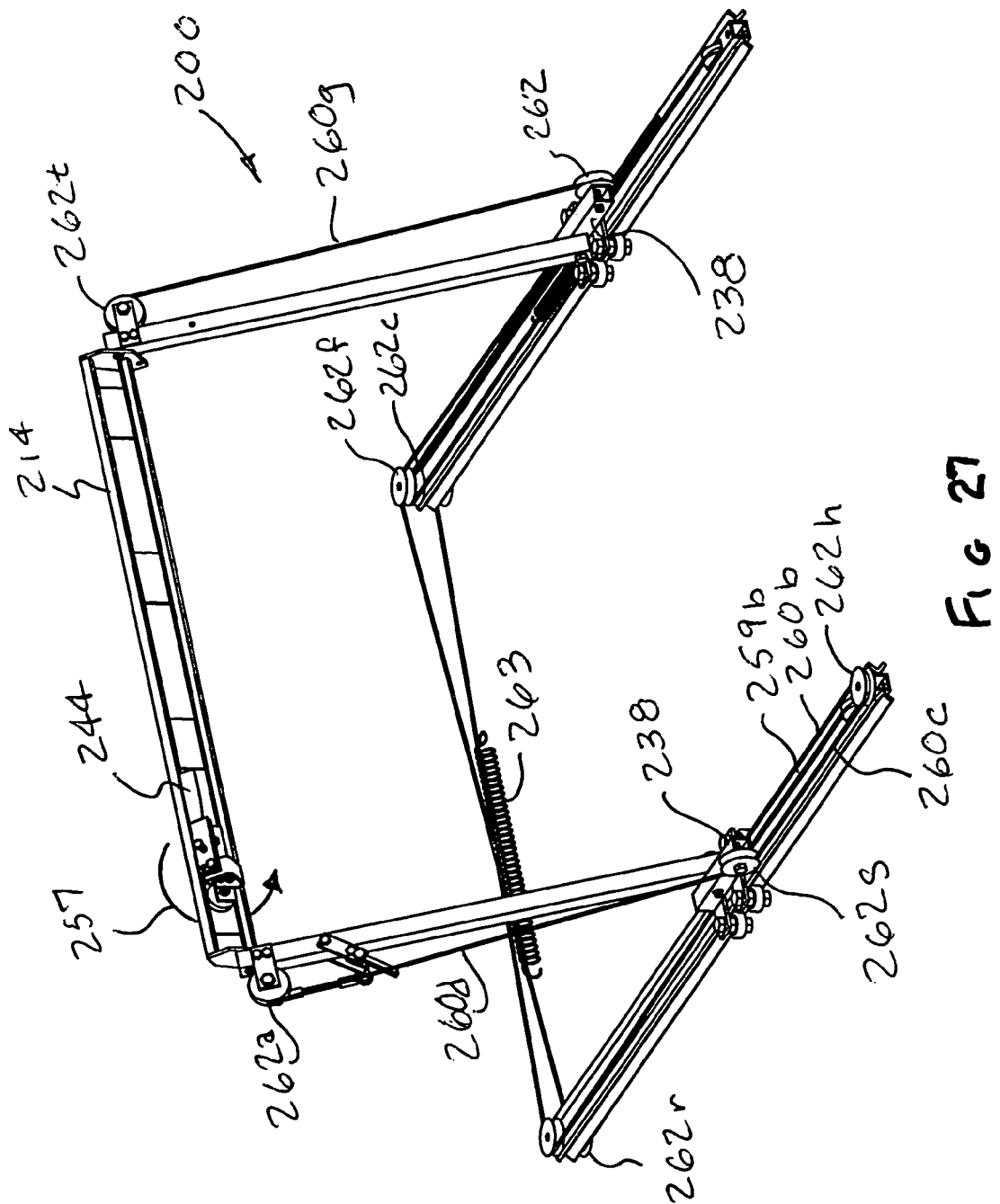
FIG. 27 is a view similar to that of FIG. 26, except with the docking system apparatus of the third embodiment in a second intermediate position, advanced from the first intermediate position.
Figure 28:
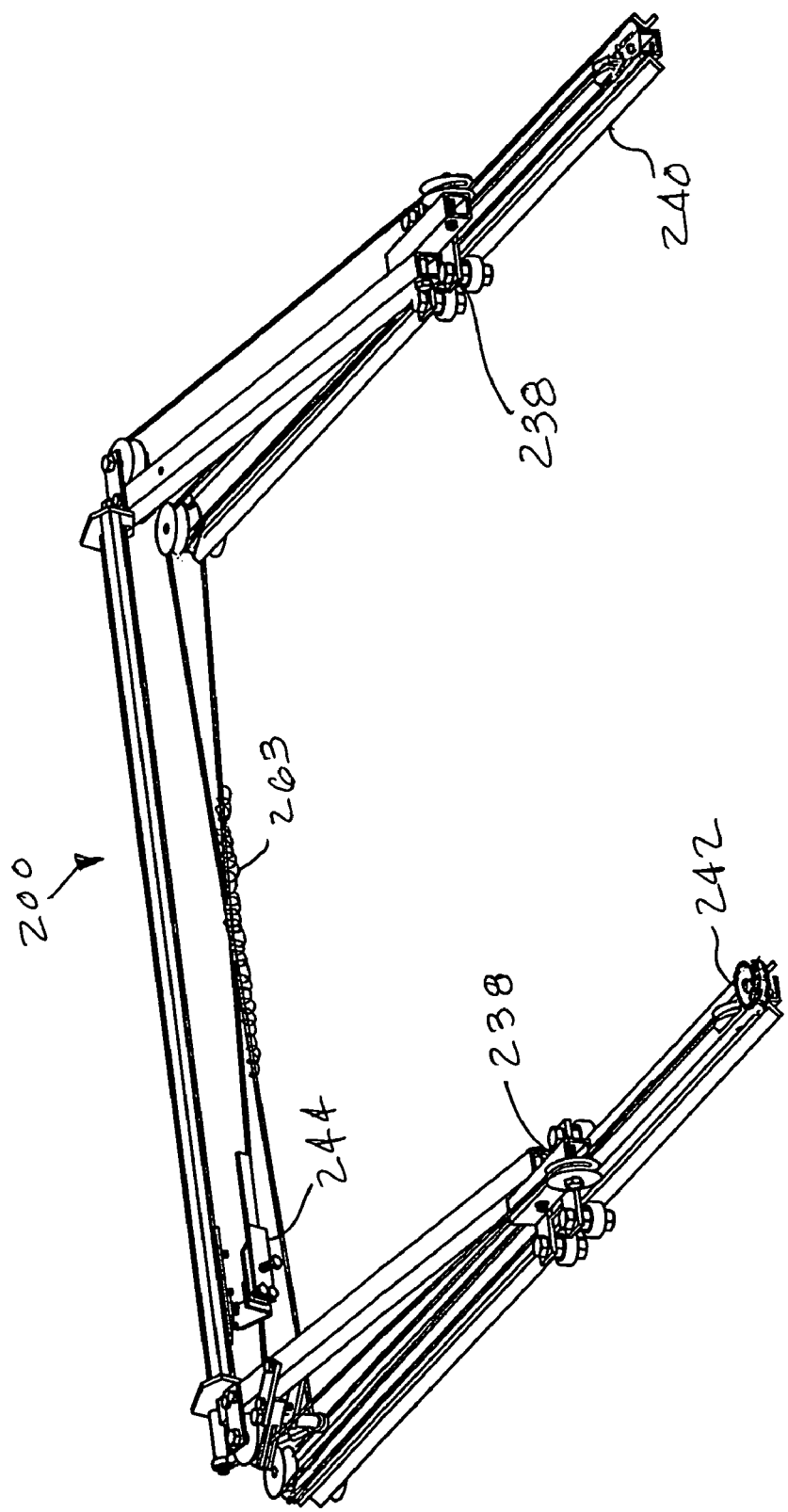
FIG. 28 is a view similar to that of FIG. 27, except with the docking system apparatus of the third embodiment in the fourth position, advanced from the second intermediate position.

Once the apparatus 200 advances to the position shown in FIG. 26, a trigger mechanism 253 moves in the direction of arrow 255 causes the cross member 214 to rotate in the direction indicated by arrow 257 in FIGS. 26 and 27, clearing the bow eye and allowing the cross member 214 and structures 216 to advance to the position shown in FIG. 28, where they remain as the watercraft is advanced to a final desired location.

Referring now most particularly to FIGS. 29 and 30 front and rear views of the tow hook cart 44 may be seen. The rear view is shown exploded. The tow hook cart 44 may be identical to carts 144 and 244 for the various embodiments, if desired. The cart 44 has a frame 300 which may be made up of a flat plate 302 and a generally C-shaped bracket 304. A cable attaches to the cart on a bolt that attaches plate 302 to bracket 304. A tow hook clamp 306 is attached to and supported by the frame 300. Three rollers 308, 310, 312 are mounted for rotation on plate 302 to guide the tow hook cart 44 along the cross member on which it is mounted. The clamp 306 has a first plate 314 preferably rigidly secured to frame 300, and a second plate 316 spaced from, but urged toward the first plate by a spring 318 mounted on a bolt 320. It is to be understood that second plate 316 has clearance holes permitting movement of plate along the axis of bolt 320 and a pair of alignment bolts 322 which extend sufficiently away from the first plate 314 to allow movement of the second plate 316 towards and away from the first plate 314. In operation, the tow hook is manually placed in the clamp and held there by friction between the first and second plates 314, 316 until the cart causes the hook to be engaged with the bow eye, at which time the clamp releases the tow hook and moves out of the way. Protrusions on the plates are provided to hold the end of the clip that the strap attaches to. This enables secure gripping of the clip with assistance of the spring until engagement with the bow eye, which disengages the clip from between the protrusions.

Figure 34:
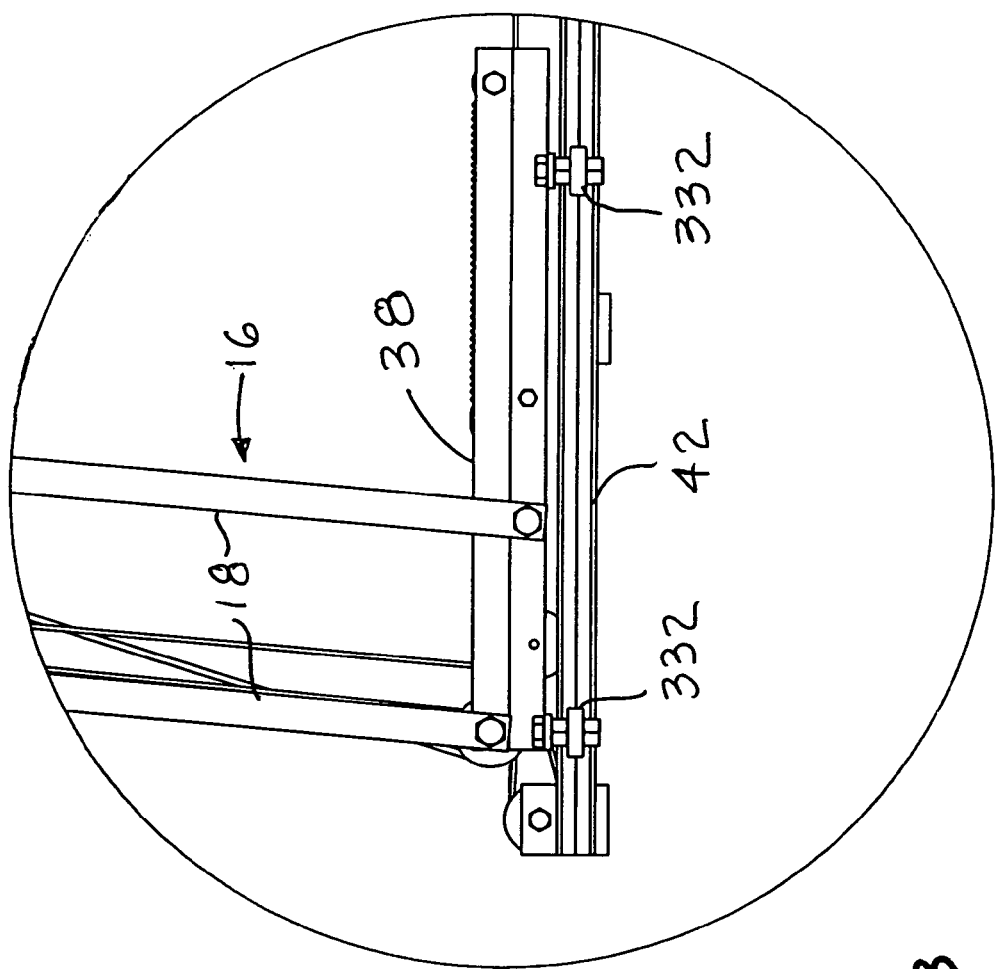
FIG. 34 is an enlarged detail side view of the support carriage of FIG. 32.
Figure 33:
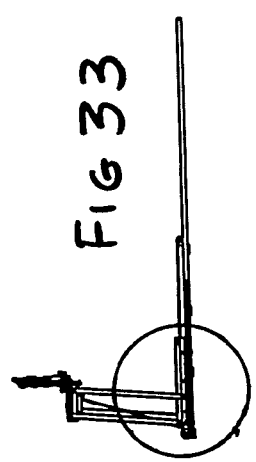
FIG. 33 is a key to FIG. 34 showing the location of the detail of FIG. 34 in the first embodiment.

Referring now most particularly to FIGS. 31, 33, and 35, keys to various views of the support carriage 38 in FIGS. 32, 34, and 36 may be seen, with the keys showing the orientation of the docking system apparatus of the first embodiment for the detail views. In FIG. 32, an end view of the support carriage 38 is shown as it appears, viewed from the side facing the watercraft. In FIG. 34, an inboard side of carriage may be seen. In FIG. 36, a top view illustrates further details of the carriage 38. Carriage 38 is carried on a pair of rollers 330 on an outboard side facing rail 40 and a pair of rollers 332 on the inboard side facing rail 42.

Referring now most particularly to FIG. 36, a spring 70 on the top provides the lift to hold the cross arm 14 up. In this view, cable 72 runs around a pulley 74 in the back of the support carriage 38, and then comes up and attaches to the cross arm 14 such that when the cross arm 14 releases the tow hook 19 from the cart 44, it lengthens the scope or reach of cable 72, enabling the cross arm 14 and upright structure 16 to fold down to the storage position 54 shown in FIG. 21.

Referring now also to FIGS. 19, 20 and 21, a cable 76 pulls cart 44 across the cross arm 14. Cable 76 begins at support carriage 38 then extends to a back of the support assembly, passing around a pulley 78, then extends back to support carriage 38 (to double the speed of cart 44). Cable 76 then extends around a pulley 80, extending up next to the parallelogram 18, after which it runs around a top pulley 82 of the parallelogram, and then extends to a pulley 84, then runs parallel to the cross arm 14 until it reaches cart 44, where it is attached to a bolt 86, as may be seen in FIG. 30. The cable 76 continues to a distal end 87 of the cross arm 14, where it passes around a pulley 88, and back to a proximal end 89 of the cross arm 14. Cable 76 then passes around a pulley 90, back to the next pulley 92 which leads it down next to the parallelogram 18. It then goes around a pulley 94 (see FIG. 36) on cart support carriage 38 that leads it to a pulley 96 (see FIG. 19). The cable 76 then continues back to a spring 98 (adjacent spring 70, see FIG. 36) which is attached to cart 44. The spring 98 is used to keep the cable 76 tight.

Referring now to FIGS. 37–50, keys and detail views of a latch mechanism useful in the practice of the present invention in the first embodiment may be seen. In each of odd numbered FIGS. 37–49, a key shows the orientation of the docking system apparatus 10 for the respective detail views in the even numbered FIGS. 38–50.

Figures 41, 42:
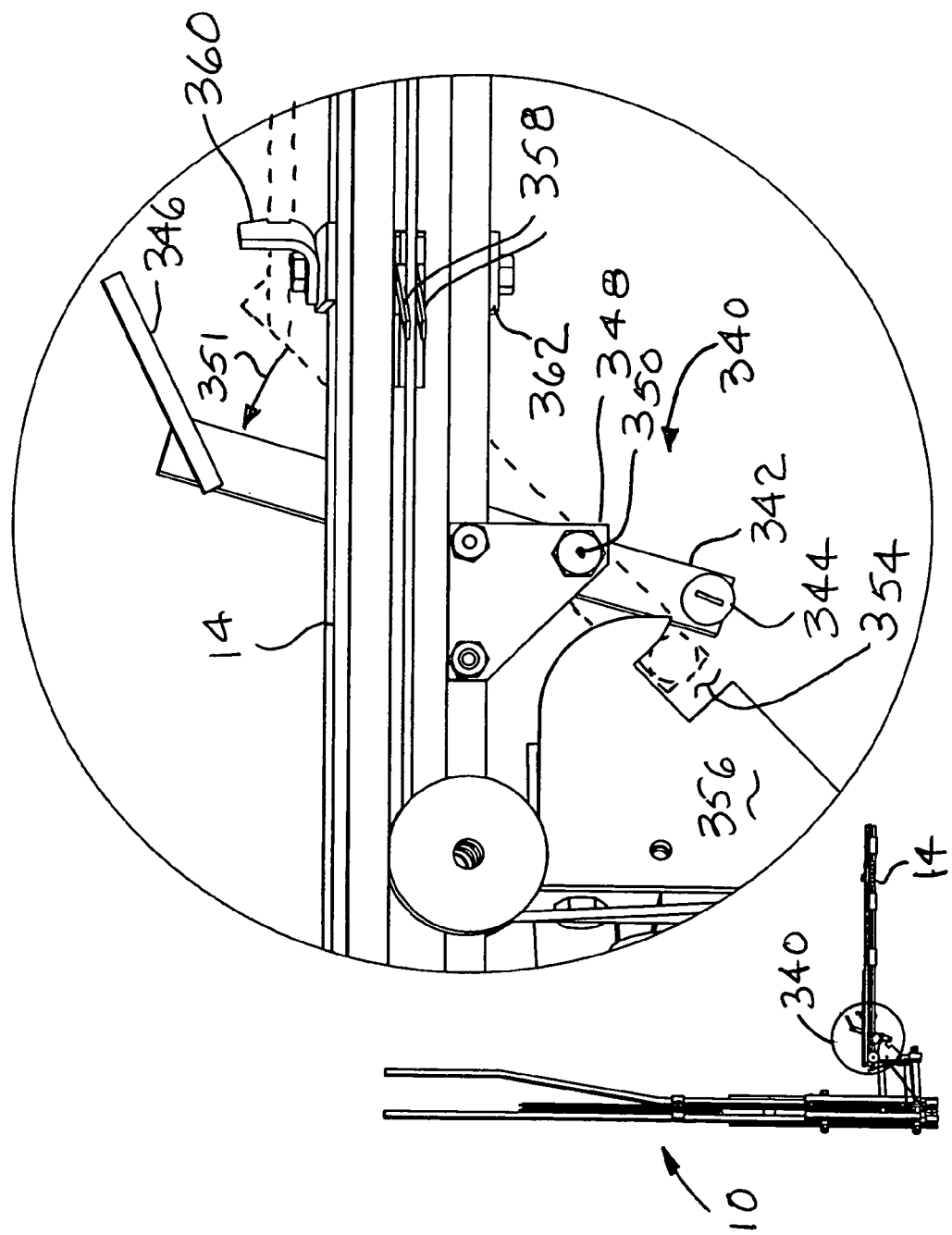
FIG. 41 is a key to FIG. 42 showing the location of the detail of FIG. 42 in the first embodiment.
FIG. 42 is an enlarged detail top view of the latch mechanism in a fully released position.

FIGS. 37 and 38 show a top view of the latch mechanism 340 in a closed and latched condition. FIGS. 39 and 40 show a top view of the latch mechanism 340 in an initial released condition. FIGS. 41 and 42 show a top view of the latch mechanism 340 in a fully released condition. While latch mechanism 340 is closed and latched, apparatus 10 holds the cross member 14 in the position shown, ready to receive a watercraft for docking. Referring now again to FIG. 20, once released, the latch mechanism 340 allows the cross member 14 to swing as indicated by arrow 50 from the position shown in dashed lines to the position shown in solid lines in FIG. 20. Referring also to FIGS. 43 and 44, the latch mechanism 340 has a pivoting bar 342 with a boss or cam follower 344 at a proximal end and a tooth 346 at a distal end. Bar 342 is mounted to a latch frame 348 for rotation about a pivot axis 350 intermediate the proximal and distal ends. The pivot axis 350 runs through the center of fastener 352. The axis 350 may be seen more clearly in the perspective detail views of FIGS. 44 and 46, showing the mechanism 340 in the latched and unlatched states, respectively. FIG. 42 shows the latched state of the bar 342 with dashed lines, and the unlatched state in solid lines, with movement from the latched state to the unlatched state indicated by arrow 351. The boss 344 engages a recess 354 in a retention plate 356 in the latched condition or position, as shown in FIGS. 38 and 44. Engagement of boss 344 with recess 354 holds the cross member 14 in the position shown in FIG. 17. Release of boss 344 from recess 354 allows the cross member to pivot out of the way of the watercraft, in the direction of arrow 50 (see FIG. 20). Release of the boss 344 from the recess 354 is accomplished when the tow hook cart moves across a pair of fingers 358 connected to a latch hook 360. It is to be understood that latch hook 360 is secured for rotation with fingers 358 in a carrier bracket 362 such that when fingers 358 move from the latched position shown in FIGS. 38 and 44 to the unlatched position shown in FIGS. 40, 42 and 46, the latch hook will move from the latched position shown in FIGS. 38 and 48 to the unlatched position shown in FIGS. 40, 42, and 50. A tension spring (not shown in this view, but which is attached between fingers 358 and a bolt on cart 44) holds the fingers 358 in the latched position.

Referring now again to FIGS. 22 and 23, in the second alternative embodiment of the present invention, no latch mechanism is necessary, because the cross member 114 does not swing out of the way of the watercraft after the tow hook engages the bow eye. The operation of the pulley system of this embodiment is as follows. A cable 160 extends around the periphery of the apparatus 100, with segments 160a–? starting and ending at cart 114 and extending between successive pulleys 162a–k. As the cross member 114 is advanced in the direction of travel indicated by arrow 151, the cable 160 pulls the cart 144 along the cross member 114. When the apparatus 100 is reset to the starting position, the cable will retract the cart 144 to the first position 146. To complete the resetting operation, it is to be understood that the tow hook is placed in the clamp of the cart 144.

Figure 52:
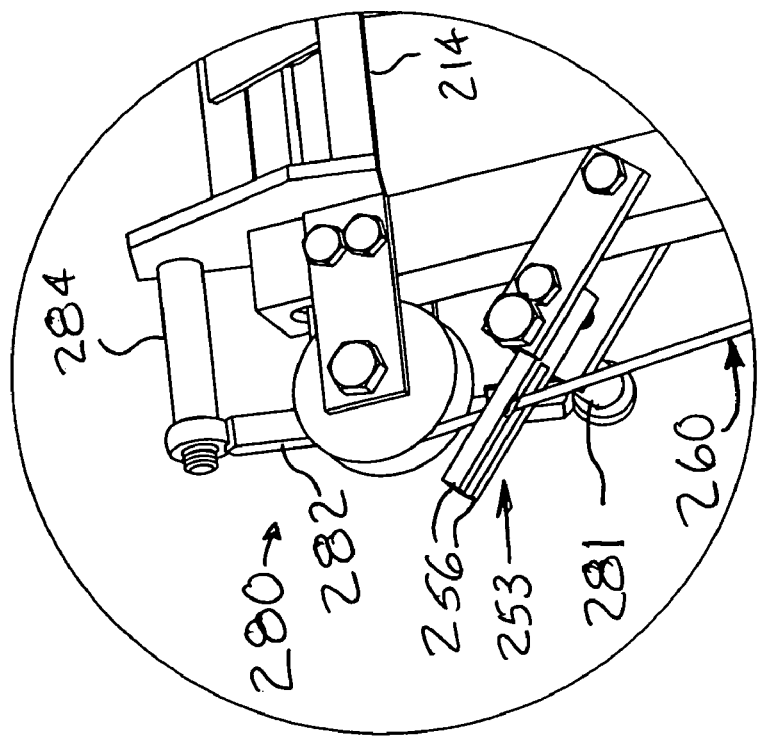
FIG. 52 is an enlarged detail front perspective view of a cross member latch in a latched position.
Figure 51:
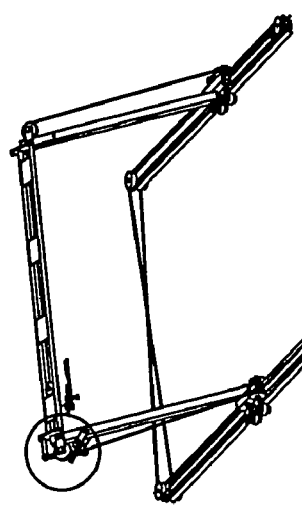
FIG. 51 is a key to FIG. 52 showing the location of the detail of FIG. 52 in the third embodiment, viewed from the front and above.
Figure 54:
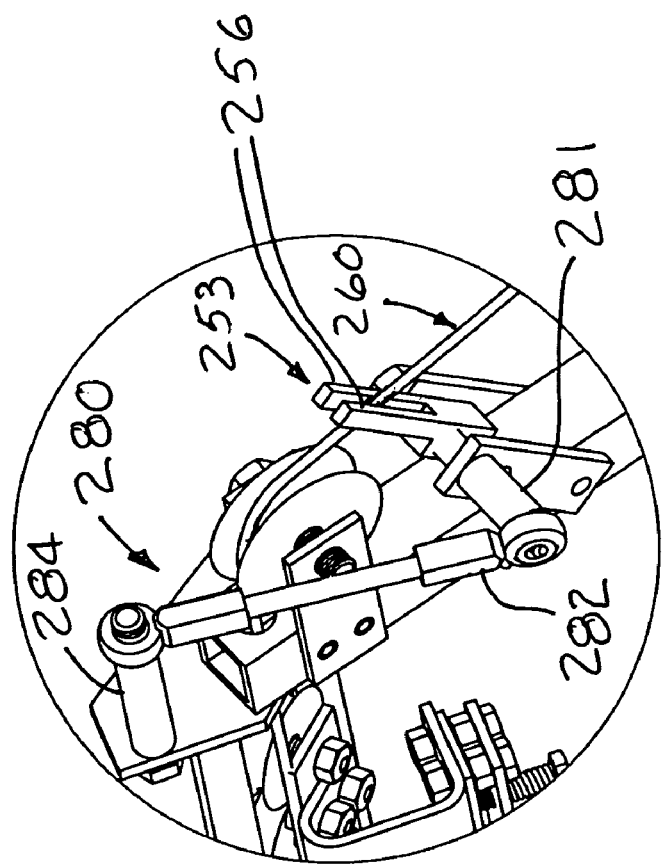
FIG. 54 is an enlarged detail rear perspective view of the cross member latch in the latched position.
Figure 53:
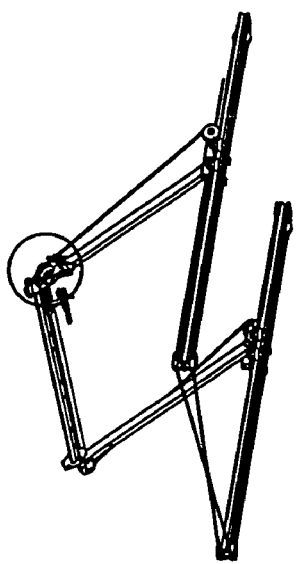
FIG. 53 is a key to FIG. 54 showing the location of the detail of FIG. 54 in the third embodiment, viewed from the rear and below.
Figure 55:
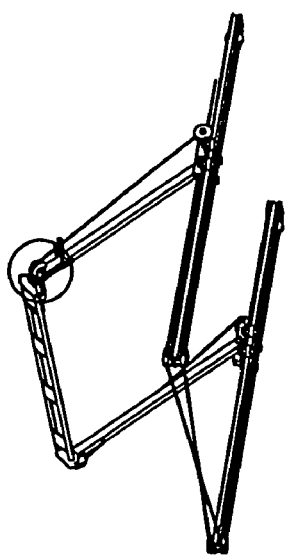
FIG. 55 is a key to FIG. 56 showing the location of the detail of FIG. 56 in the third embodiment, viewed from the rear and below.
Figure 56:
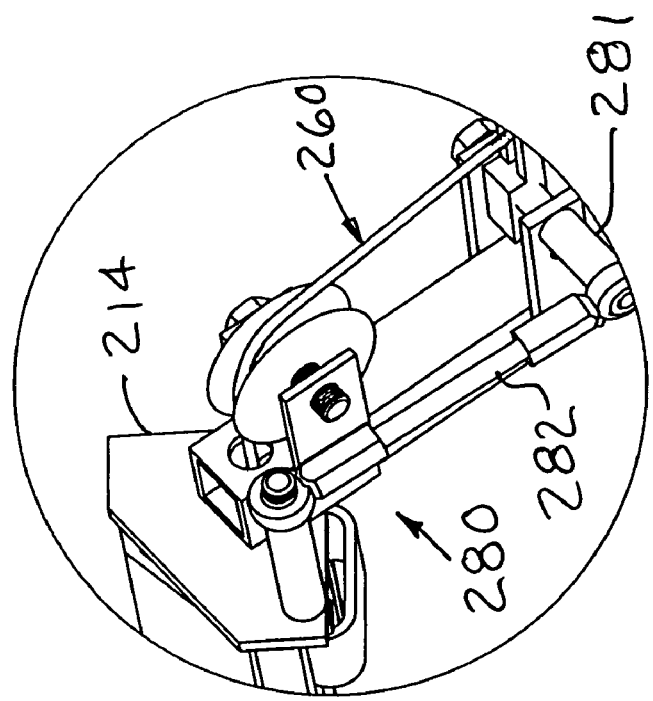
FIG. 56 is an enlarged detail rear perspective view of the cross member latch similar to that of FIG. 54, except in a released position.

Referring now to FIGS. 51–56, a cross member latch 280 may be seen. Cross member latch 280, along with trigger mechanism 253 provides for rotation of cross member 214 in the direction of arrow 255 (see FIG. 27). In FIG. 52, the cross member 214 is in the normal position as it is when the cart 244 moves past the bow eye and causes the tow hook to engage the bow eye. FIGS. 26 and 51 show the apparatus 200 of the third embodiment with the cart 244 approaching the end of the cross member 214 where the latch 280 is located. In this condition, cross member 214 remains as it was during preceding operation, and the trigger mechanism 253 is in a "ready" position, shown in FIGS. 24, 25, 52 and 54. Cross member latch 280 may include a first control arm 281 connected to the trigger mechanism 253, a link 282, and a second control arm 284 connected to the cross member 214. Link 282 connects the first and second control arms together. Trigger mechanism 253 may include a pair of fingers 256 straddling cable 260 connected to the cart 244. There is a ferrule or enlarged diameter item (not shown) fastened on the cable 260 which is small enough to pass over the pulley adjacent the trigger mechanism 253, but large enough to not pass through the fingers 256 to trip the trigger mechanism 253 when the ferrule contacts the fingers 256. As the trigger mechanism 253 is tripped, the first control arm 281 pulls on the second control arm 284 via link 282, rotating the cross member 214 from the position shown in FIGS. 24, 25, 52 and 54 to the position shown in FIG. 56.

One method of retrieval of the watercraft after it is attached to the strap is to use a two speed winch to reduce the time during which the watercraft may be out of alignment with what it is being loaded into or onto. For trailer operation, such a two speed winch may be powered by a battery on the trailer which may be recharged using a charger or current limiter connected to a 12 volt system of a land vehicle towing the trailer. Alternatively, the winch may be powered directly from the towing vehicle's electrical system.

This invention is not to be taken as limited to all of the details thereof as modifications and variations thereof may be made without departing from the spirit or scope of the invention.

What is claimed is:

1. Apparatus for retrieving a watercraft by automatically attaching a hook to an eye on a prow of the watercraft, the apparatus comprising:
   a. a cross member having first and second ends, and having a cross member support such that the cross member is supported and oriented
      i. generally horizontally above a water level, and
      ii. generally perpendicular to a direction of advance of the watercraft and movable in response to contact with the watercraft moving in the direction of advance;
   b. a carriage movably mounted on the cross member and releasably carrying a hook;
   c. a first positioning member urging the carriage towards the first end of the cross member; and
   d. means for moving the carriage towards the second end of the cross member when the cross member is contacted and moved by the watercraft moving in the direction of advance such that the hook engages the eye on the prow of the watercraft as the watercraft moves in the direction of advance.

2. The apparatus of claim 1 wherein the cross member support further comprises a generally upright structure supporting the cross member on at least one end thereof, and initially at a level above the eye on the prow of the watercraft.

3. The apparatus of claim 1 further comprising a frame supporting the cross member support and wherein the means for moving the carriage comprises a cable connected between the frame and the carriage such that the carriage is moved by the cable when the cross member is moved by the watercraft moving in the direction of advance.

4. The apparatus of claim 2 wherein the generally upright structure is movable to lower the level of the cross member.

5. The apparatus of claim 4 wherein the cross member is lowered by the watercraft until the cross member contacts the eye on the prow of the watercraft.

6. The apparatus of claim 2 wherein the cross member has a pair of ends, and the generally upright structure supports the cross member at each end thereof.

7. A method of attaching a hook to an eye on a prow of a watercraft comprising the steps of:
   a. positioning the hook on a carriage movably attached to a cross member positioned generally perpendicularly to a direction of advance of the watercraft;
   b. moving the carriage along the cross member in response to contact between the watercraft and the cross member;
   c. engaging the hook with the eye as the carriage moves along the cross member; and
   d. releasing the hook from the carriage after the hook is engaged with the eye.

8. A method of retrieving a watercraft by automatically attaching a hook to a bow eye on the watercraft, the method comprising:
   a. positioning a cross member generally perpendicular to a direction of advance of the watercraft and generally horizontal at a height above the bow eye; and
   b. moving the cross member generally vertically downward in response to contact with the watercraft moving in the direction of advance and simultaneously advancing a carriage across the cross member and releasably carrying a hook across the cross member until the hook engages the bow eye.

9. The method of claim 8 further comprising the additional step of:
   c. releasing the hook from the carriage after the hook engages the bow eye.

10. The method of claim 9 further comprising the additional step of:
   d. moving the cross member away from the watercraft after releasing the hook from the carriage.

* * * * *